US009448352B2

(12) United States Patent
Matsumura et al.

(10) Patent No.: US 9,448,352 B2
(45) Date of Patent: Sep. 20, 2016

(54) SURFACE LIGHT SOURCE APPARATUS HAVING CUT OUT PORTIONS WHERE A REFLECTING PORTION IS NOT PRESENT

(71) Applicant: Panasonic Intellectual Property Management Co., Ltd., Osaka (JP)

(72) Inventors: Suguru Matsumura, Okayama (JP); Yoshihiro Kawasaki, Okayama (JP); Kazuhiro Hayashi, Okayama (JP); Akihisa Yamada, Osaka (JP); Masahiko Hirata, Nara (JP); Keiichi Zaitsu, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/408,815

(22) PCT Filed: Jun. 5, 2013

(86) PCT No.: PCT/JP2013/003522
§ 371 (c)(1),
(2) Date: Dec. 17, 2014

(87) PCT Pub. No.: WO2013/190788
PCT Pub. Date: Dec. 27, 2013

(65) Prior Publication Data
US 2015/0185399 A1 Jul. 2, 2015

(30) Foreign Application Priority Data
Jun. 19, 2012 (JP) ................................ 2012-137512

(51) Int. Cl.
*F21V 7/04* (2006.01)
*F21V 8/00* (2006.01)

(52) U.S. Cl.
CPC ............ *G02B 6/0038* (2013.01); *G02B 6/0068* (2013.01); *G02B 6/0036* (2013.01); *G02B 6/0061* (2013.01)

(58) Field of Classification Search
CPC . G02B 6/0036; G02B 6/0068; G02B 6/0061
USPC .......................................................... 362/613
See application file for complete search history.

(56) References Cited

U.S. PATENT DOCUMENTS

| 6,454,452 B1 | 9/2002 | Sasagawa et al. |
| 2005/0243574 A1* | 11/2005 | Teng .................... G02B 6/0061 |
| | | 362/600 |

(Continued)

FOREIGN PATENT DOCUMENTS

| JP | 08-271891 | 10/1996 |
| JP | 2000-305073 | 11/2000 |

(Continued)

OTHER PUBLICATIONS

International Preliminary Report on Patentability and Written Opinion of the International Searching Authority issued Dec. 31, 2014 in International (PCT) Application No. PCT/JP2013/003522.

(Continued)

*Primary Examiner* — Elmito Breval
*Assistant Examiner* — Hana Featherly
(74) *Attorney, Agent, or Firm* — Wenderoth, Lind & Ponack, L.L.P.

(57) ABSTRACT

A surface light source apparatus includes an end face for taking in light emitted from a light source and a main surface for emitting the light. The surface light source apparatus further includes a plurality of structure bodies formed on an opposed surface disposed opposite to the main surface in the surface light source apparatus, each of which has a reflecting surface facing the point light source. Each structure body has a cut-off portion which removes a portion on the reflecting surface in a longitudinal direction of the structure body and in a height direction.

11 Claims, 44 Drawing Sheets

(56) References Cited

U.S. PATENT DOCUMENTS

| | | |
|---|---|---|
| 2009/0086509 A1 | 4/2009 | Omori et al. |
| 2009/0109703 A1 | 4/2009 | Chen et al. |
| 2009/0122229 A1 | 5/2009 | Kim et al. |
| 2010/0097825 A1 | 4/2010 | Weng et al. |

FOREIGN PATENT DOCUMENTS

| | | |
|---|---|---|
| JP | 2004-053665 | 2/2004 |
| JP | 2004-079418 | 3/2004 |
| JP | 2004-362804 | 12/2004 |
| JP | 2005-011599 | 1/2005 |
| JP | 2006-075362 | 3/2006 |
| JP | 2006-351286 | 12/2006 |
| JP | 2009-081094 | 4/2009 |
| JP | 2009-122637 | 6/2009 |
| JP | 2010-097933 | 4/2010 |
| JP | 2012-164511 | 8/2012 |

OTHER PUBLICATIONS

International Search Report issued Jul. 9, 2013 in International (PCT) Application No. PCT/JP2013/003522.

Office Action issued Jun. 7, 2016 in corresponding Japanese Patent Application No. 2014-520905.

\* cited by examiner

Fig.28

| 0.99 | 0.99 | 0.96 |
|------|------|------|
| 0.97 | 0.97 | 1 ⊙ |
| 0.98 | 0.98 | 0.96 |

Fig.44

| 0.05 | 0.03 | 0.01 |
|------|------|------|
| 0.39 | 0.73 | 1    |
| 0.05 | 0.03 | 0.02 |

SURFACE LIGHT SOURCE APPARATUS HAVING CUT OUT PORTIONS WHERE A REFLECTING PORTION IS NOT PRESENT

TECHNICAL FIELD

The present disclosure is related to surface light source apparatuses used for liquid crystal displays and so on.

BACKGROUND ART

Patent Document 1 discloses a liquid crystal display. The liquid crystal display includes a surface light source apparatus that planarly diffuses light emitted from a point light source.

PRIOR ART DOCUMENT

Patent Document

Patent Document 1: JP 2004-53665 A

OVERVIEW OF INVENTION

Problem to be Solved by the Invention

There is a problem in that conventional surface light source apparatuses cannot fully uniformalize the luminance distribution. Therefore, a conventional liquid crystal display includes, in addition to a surface light source apparatus, an optical sheet such as a diffusion sheet that diffuses light emitted from a surface light source apparatus.

The present disclosure provides a surface light source apparatus capable of uniformalizing the luminance distribution with no optical sheet being provided.

Means for Solving Problem

A surface light source apparatus according to the present disclosure includes an end face for taking in light emitted from a point light source and a main surface for emitting the light. The surface light source apparatus further includes a plurality of structure bodies formed on an opposed surface disposed opposite to the main surface in the surface light source apparatus, each of which has a reflecting surface facing the point light source. Each structure body has a cut-off portion which removes a portion on the reflecting surface in a longitudinal direction of the structure body and in a height direction.

Effect of the Invention

The surface light source apparatus according to the present disclosure can uniformalize the luminance distribution by the surface light source apparatus itself with no optical sheet being provided.

BRIEF DESCRIPTION OF DRAWINGS

FIG. 28 is a diagram showing the luminance distribution of the surface light source apparatus according to Embodiment 2.

FIG. 44 is a drawing showing the luminance distribution of the conventional surface light source apparatus.

EMBODIMENTS OF THE INVENTION

Embodiments are described below in detail with reference to the drawings as necessary. However, unnecessarily detailed descriptions may be omitted. For example, detailed descriptions of matters which are already well-known and redundant descriptions of substantially the same configurations may be omitted. This is to avoid unnecessary redundancy in the following descriptions to facilitate understanding by a person skilled in the art.

The applicant provides the accompanying drawings and the following descriptions to help a person skilled in the art to fully understand the present disclosure, and the applicant does not intend to limit the subject matter defined in the claims by the accompanying drawing or the following descriptions.

Embodiment 1

Figure 1:
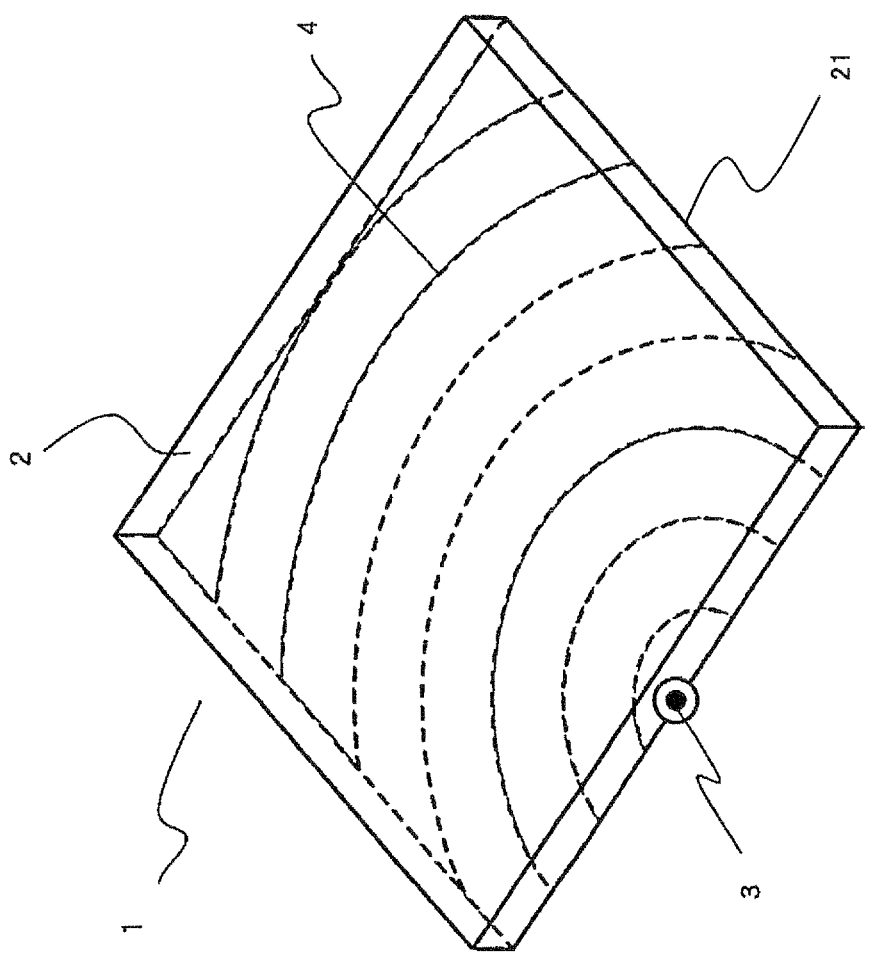
FIG. 1 is a perspective view of a surface light source apparatus according to Embodiment 1.
Figure 2:
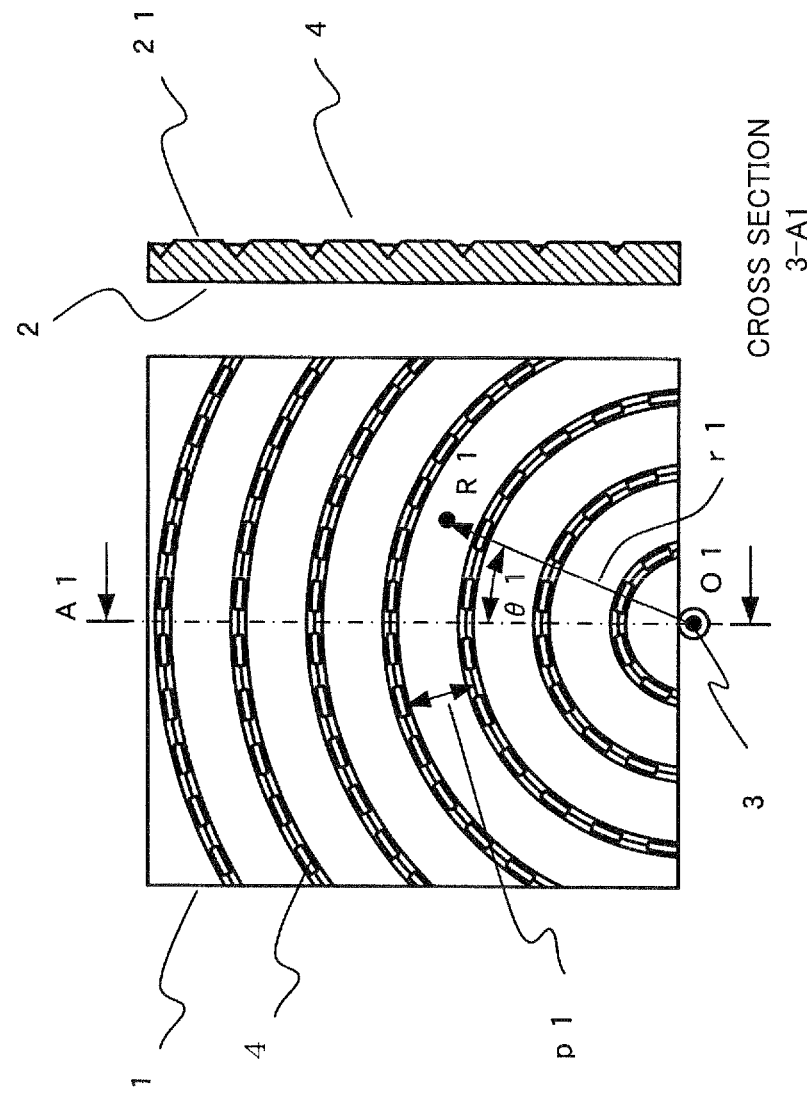
FIG. 2A is a plan view of the surface light source apparatus according to Embodiment 1.
FIG. 2B is a cross-sectional view (3-A1) of the surface light source apparatus according to Embodiment 1.

FIG. 1 is a perspective view of a surface light source apparatus according to Embodiment 1. FIG. 2A is a plan view of the surface light source apparatus according to Embodiment 1. FIG. 2B is a drawing (cross-sectional view (3-A1) of the surface light source apparatus according to Embodiment 1. The surface light source apparatus 1 is formed of resin material in a plate shape, where the resin material is transparent and has a large refractive index, such as polycarbonate resin, acrylic resin, and the like. The surface light source apparatus 1 includes a main surface 2, an opposed surface 21 disposed opposite to the main surface 2 (a surface on a back side of the main surface 2). The surface light source apparatus 1 includes a plurality of structure bodies 4 arranged therewithin. The plurality of structure bodies 4 are formed in a groove shape, by cutting of the resin material being present between the main surface 2 and the opposed surface 21 from the opposed surface 21 side. Light emitted from a point light source 3 propagates inside the surface light source apparatus 1. The surface light source apparatus 1 changes the light-guiding state of the light with the plurality of structure bodies 4, and then outputs the light to the exterior through the main surface 2. The main surface 2 has a size of 70 mm in the vertical direction and 70 mm in the horizontal direction. The surface light source apparatus 1 has a thickness of 2 mm in a direction orthogonal to the main surface 2. The point light source 3 is provided on an end face on the surface light source apparatus 1 so that it osculates the end face. Each structure body 4 is formed in an approximately circular arcuate shape around the point light source 3 as the center. In addition, the structure bodies 4 are concentrically arranged at a predetermined pitch around the point light source 3 as the center. Because the structure bodies 4 are formed in an approximately circular arcuate shape around the point light source 3 as the center, the light propagating inside the surface light source apparatus 1 can be efficiently reflected by the structure bodies 4. Therefore, the emission efficiency from the main surface 2 of the light can be improved.

Figure 3:
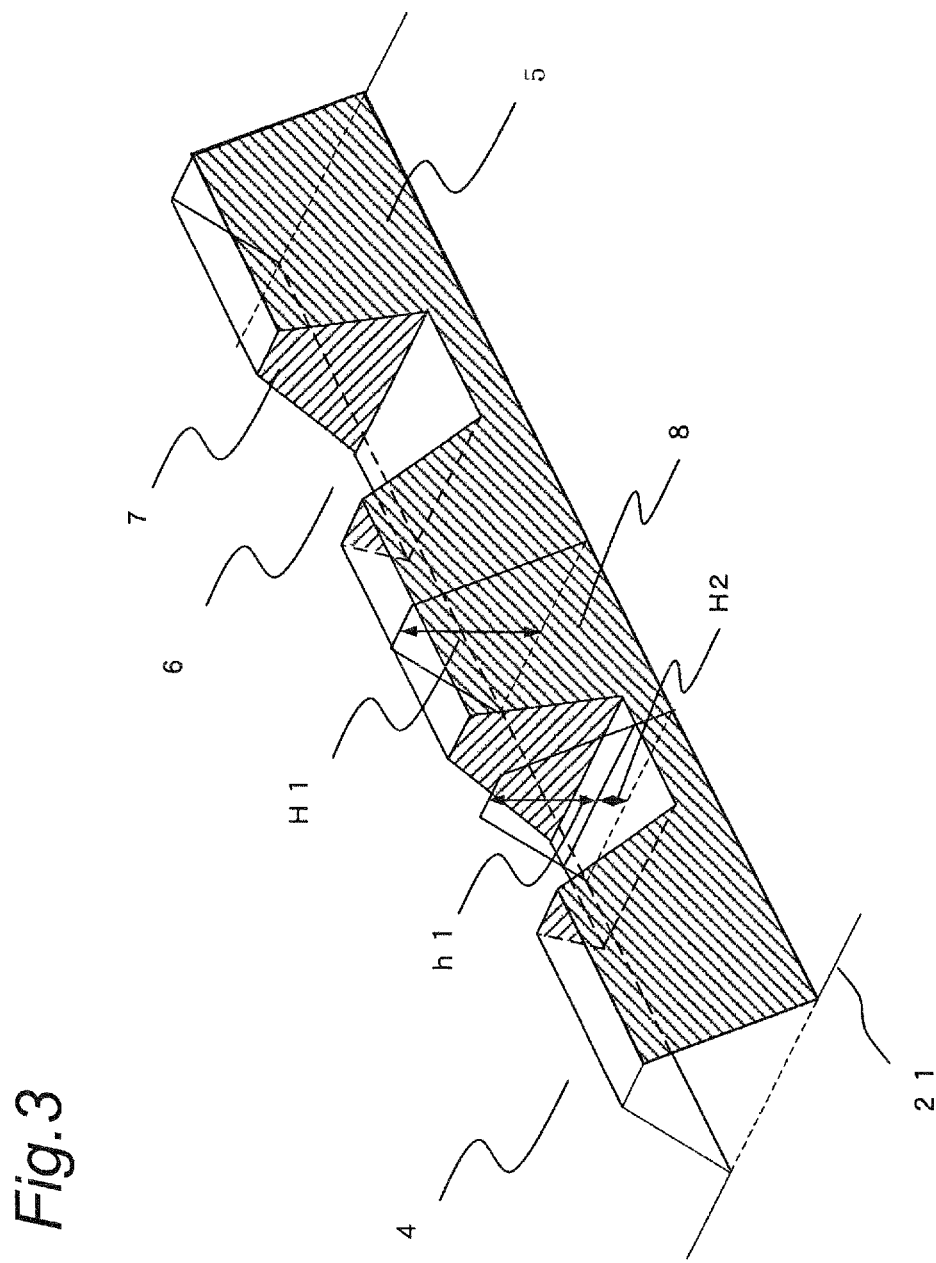
FIG. 3 is a perspective view of a structure body of the surface light source apparatus according to Embodiment 1.

FIG. 3 is a perspective view of the structure body 4 formed inside the surface light source apparatus 1 according to Embodiment 1. In this embodiment, each structure body 4 is an optical structure body formed in a groove shape by the cutting of the resin material present between the main surface 2 and the opposed surface 21 in the surface light source apparatus 1 from the opposed surface 21 side. In the example of FIG. 3, each structure body 4 is formed so that its cross-section taken along a direction orthogonal to the longitudinal direction of the structure body 4 has a trapezoidal shape. The structure body 4 includes cut-off portions 6 and cut-off remaining portions 8. The cut-off portions 6 are portions each of which looks like a part of the structure body 4 having being cut off. The cut-off remaining portions 8 are portions each of which looks like a remaining part of the structure body 4 not having being cut off. More precisely, each cut-off remaining portion 8 is formed by the cutting of the resin material from the opposed surface 21 side to a depth H1. In addition, each cut-off portion 6 is formed by the cutting of the resin material from the opposed surface 21 side to a depth H2. Therefore, steps (cut-off) are formed between the cut-off portions 6 and the cut-off remaining portions 8 on the structure body 4, which have a height difference h1 between the depth H1 of the cut-off remaining portions 8 and the depth H2 of the cut-off portions 6. Accordingly, each cut-off portion 6 removes a portion on a reflecting surface 5 in the longitudinal direction of the structure body and in the height direction. The depth H2 of the cut-off portions 6 is 0.5 μm.

Figure 4:
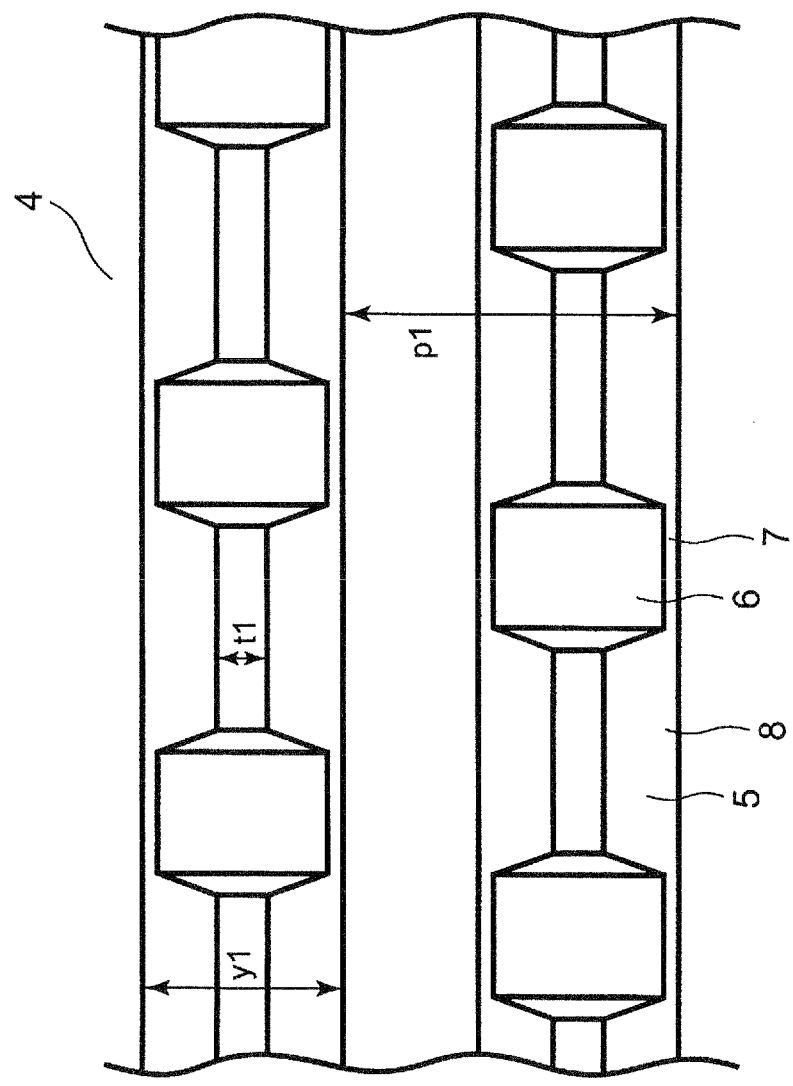
FIG. 4 is a drawing showing the structure bodies of the surface light source apparatus according to Embodiment 1 when viewed from a main surface side.

FIG. 4 is a drawing showing the structure bodies 4 of the surface light source apparatus 1 according to Embodiment 1 when viewed from the main surface 2 side. The structure bodies 4 are arranged at a pitch p1 (for example, 0.3 mm pitch). Light propagating inside the surface light source apparatus 1 is reflected not only by the reflecting surfaces 5 but also by side surfaces 7 of the cut-off portions 6, and the light is in turn emitted from the main surface 2. Therefore, improvement in the emission efficiency of the light can be achieved.

Figure 5:
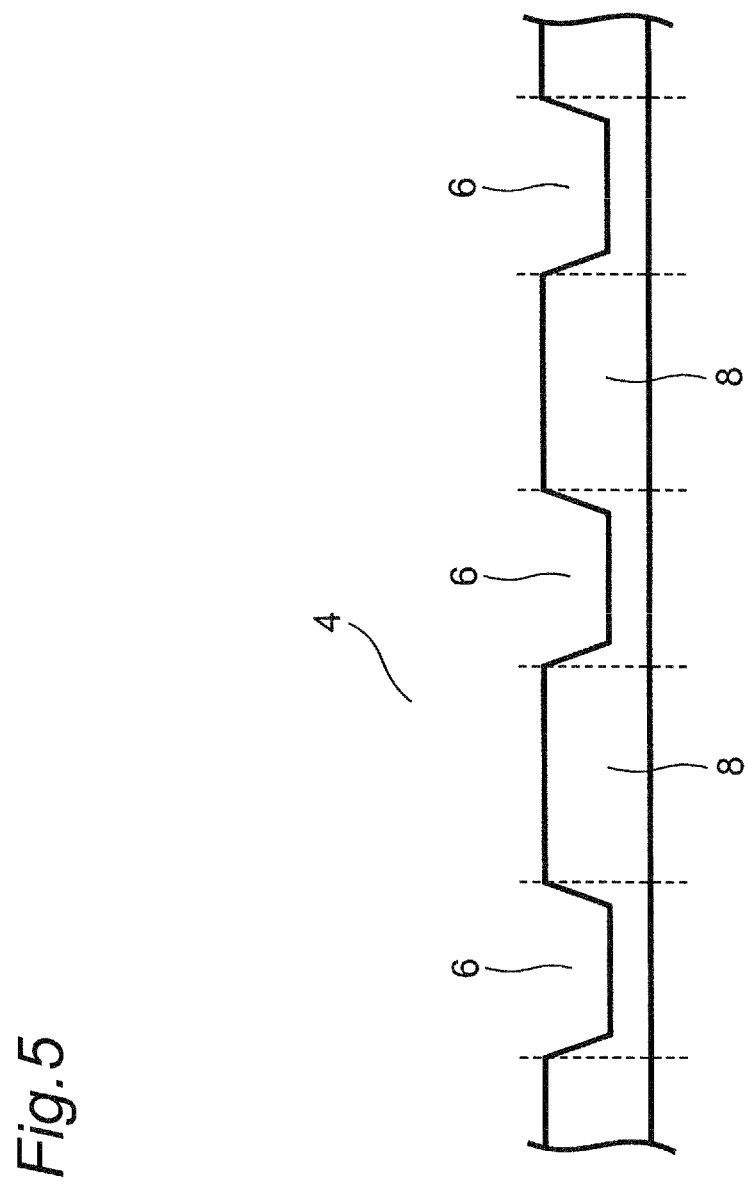
FIG. 5 is a drawing showing the structure body of the surface light source apparatus according to Embodiment 1 when viewed from the point light source side.

FIG. 5 is a drawing showing the structure body 4 shown in FIG. 4 when viewed from the point light source 3 side. The cut-off portions 6 and the cut-off remaining portions 8 are alternately arranged on the structure body 4 in the longitudinal direction of the structure body 4.

Figure 6:
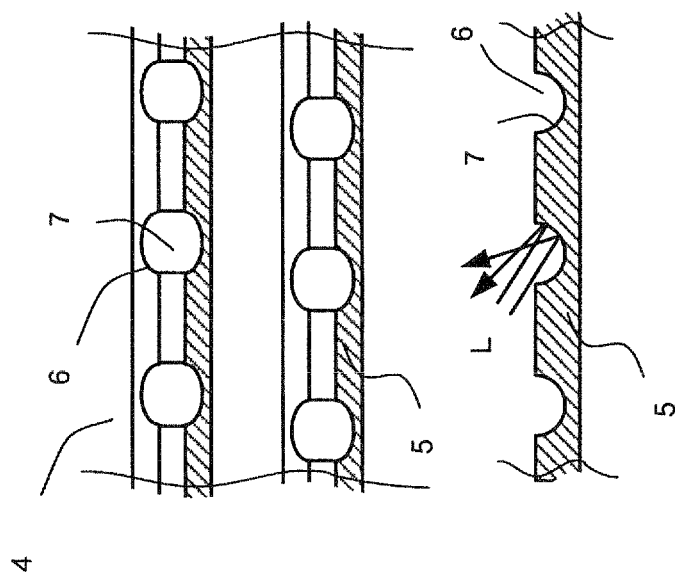
FIG. 6A is a drawing showing the structure bodies when viewed from the main surface side, in a case of cut-off portions having a circular arcuate shape in the surface light source apparatus according to Embodiment 1.
FIG. 6B is a drawing showing the structure body when viewed from the point light source side.

FIG. 6A is a drawing showing the structure bodies 4 when viewed from the main surface 2 side, in a case of the cut-off portions 6 having a circular arcuate shape in the surface light source apparatus 1 according to Embodiment 1. FIG. 6B is a drawing showing the structure body 4 when viewed from the point light source 3 side. Similarly to the case of the structure body 4 having a cross-section of an approximately trapezoidal shape as shown in FIG. 3, the light L propagating inside the surface light source apparatus 1 is reflected not only by the reflecting surfaces 5 but also by the side surfaces 7 of the cut-off portions 6 having an approximately circular arcuate shape, and the light is in turn emitted from the main surface 2. Therefore, improvement in the emission efficiency of the light can be achieved.

Figure 7:
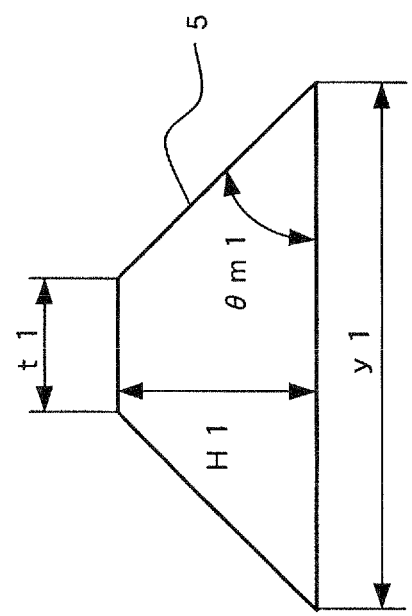
FIG. 7 is a drawing showing a cross-section of the structure body of the surface light source apparatus according to Embodiment 1.

FIG. 7 is a cross-sectional view of the structure body 4 taken along a direction orthogonal to the longitudinal direction of the structure body 4. On the structure body 4 shown in FIG. 7, the reflecting surface 5 is sloped at an angle θm1 of 50°, and the upper end surface of the structure body 4 has a length t1 of 2 μm in a width direction.

Figure 8:
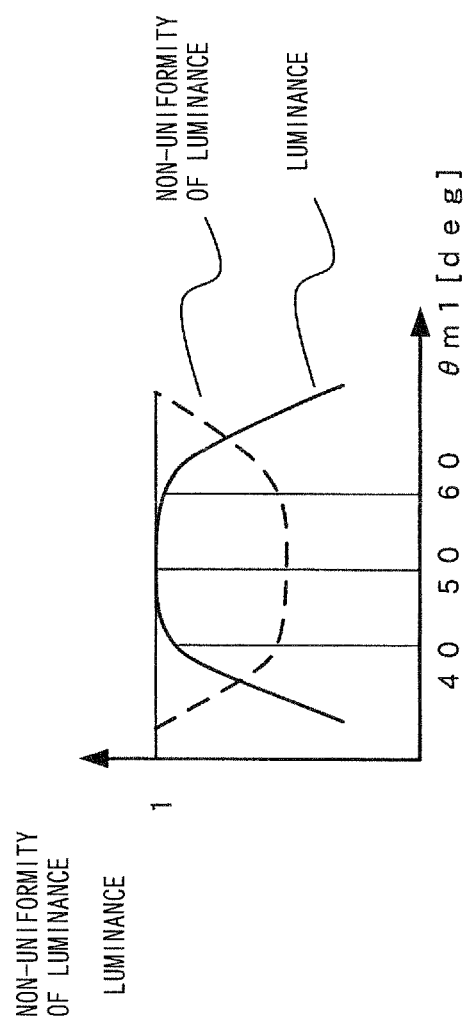
FIG. 8 is a drawing showing relationship between the angle of a reflecting surface of the structure body of the surface light source apparatus according to Embodiment 1 and the luminance and luminance distribution.

FIG. 8 is a drawing showing relationship between the angle θm1 of the reflecting surface on the structure body 4 of the surface light source apparatus 1 according to Embodiment 1, and the luminance and the non-uniformity of luminance. The vertical axis shows the luminance which is normalized to have a maximum luminance of 1. The non-uniformity of luminance is expressed as ((maximum luminance)−(minimum luminance))/((maximum luminance)+(minimum luminance)). The horizontal axis shows the angle θm1 of the reflecting surface. As shown in FIG. 8, the angles θm1 in a range from 40° to 60° (θm1=40~60°) provides high luminance and low non-uniformity of luminance. This point is taken into consideration, and the angle θm1 is set to 50° (θm1=50°), in the surface light source apparatus 1 of Embodiment 1, t.

Figure 9:
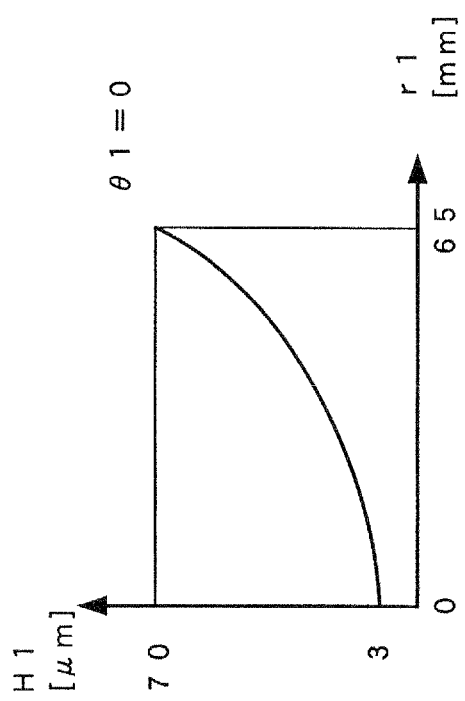
FIG. 9 is a drawing showing relationship between the height of the structure bodies of the surface light source apparatus according to Embodiment 1 and the distance from the point light source to an arbitrary point.

FIG. 9 is a drawing showing relationship between the height of the structure bodies 4 of the surface light source apparatus 1 according to Embodiment 1 and the distance from the point light source 3 to an arbitrary point. The horizontal axis shows the distance r1 (See FIG. 2A) from a light emitting surface of the point light source 3 to an arbitrary point R1 on the main surface 2 of the surface light source apparatus 1. The vertical axis shows the height H1 of the structure bodies 4. In this embodiment, the structure bodies 4 are configured so that the height H1 of the structure bodies 4 becomes higher as the distance r1 becomes larger. Specifically, in the example of FIG. 9, the structure bodies 4 are configured so that the height H1 varies from 3 μm to 70 μm according to the increase of the distance r1. According to this, the length y1 of lower basis of the structure bodies 4 in the width direction varies from 7 μm to 119 μm, since the angle θm1 of the reflecting surface 5 is 50°.

Figure 10:
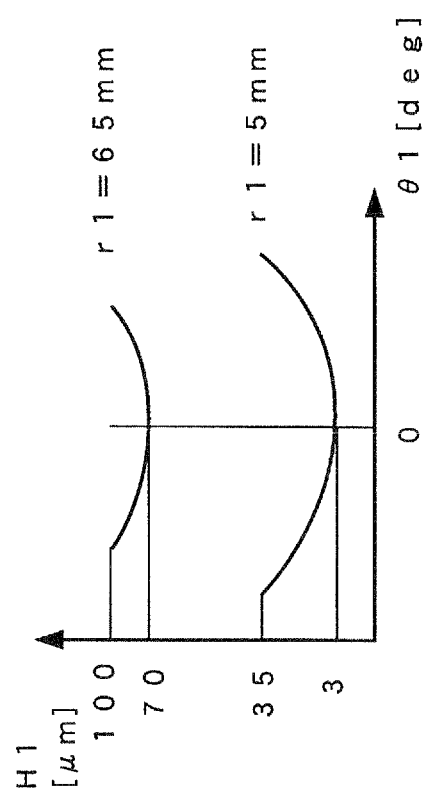
FIG. 10 is a drawing showing relationship between the height of the structure bodies according to Embodiment 1 and the angle O1-A1-R1 (θ1).

FIG. 10 is a drawing showing relationship between the height of the structure bodies 4 according to Embodiment 1 and an angle A1-O1-R1 (θ1) (See FIG. 2A). The horizontal axis shows the angle θ1 (angle A1-O1-R1) shown in FIG. 2A, and the vertical axis shows the height H1 of the structure bodies 4. The height H1 of the structure bodies 4 becomes higher as the absolute value of the angle θ1 becomes wider. In addition, the height H1 of the structure bodies 4 becomes higher up to a maximum of 100 μm, as the distance r1 becomes larger. Because the height H1 of the structure bodies 4 is distributed as shown in FIGS. 8 and 9, the light propagating inside the surface light source apparatus 1 can be almost uniformly and efficiently emitted from the whole main surface 2.

Figure 43:
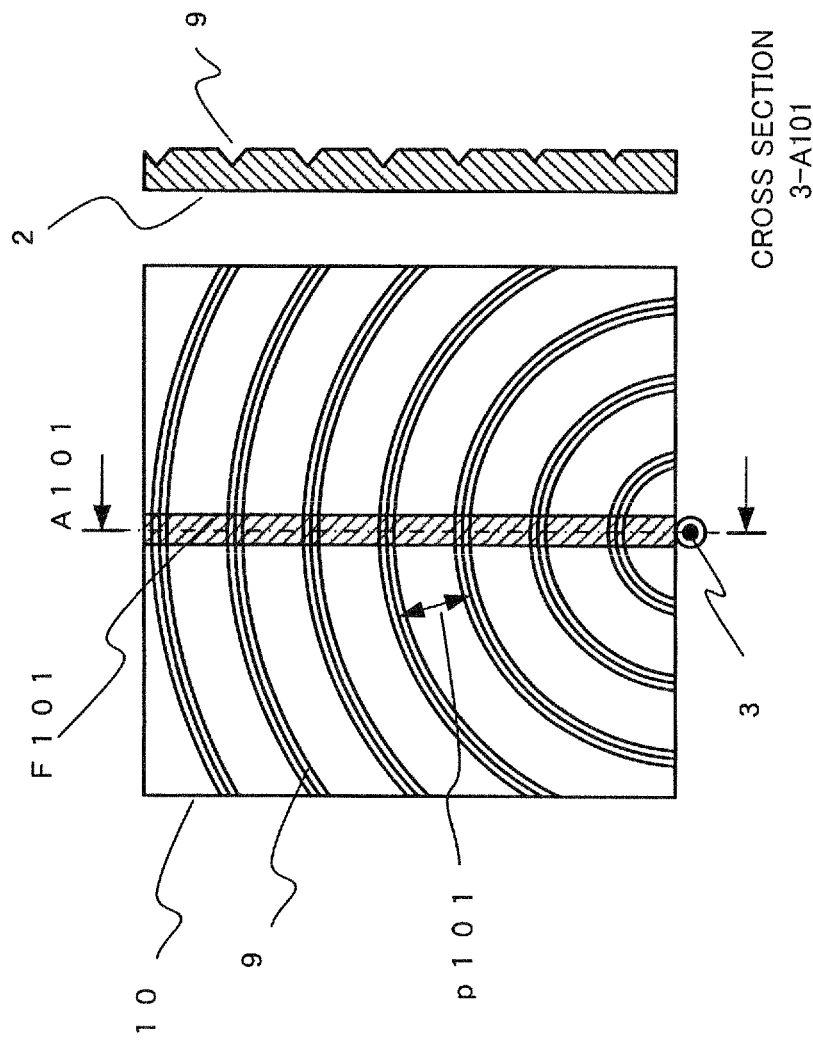
FIG. 43A is a plan view of a conventional surface light source apparatus.
FIG. 43B is a cross-sectional view (3-A101) of the conventional surface light source apparatus.

FIG. 43A is a plan view of a surface light source apparatus 10 that includes structure bodies having no cut-off portion. FIG. 43B is a cross-sectional view (3-A101) of the surface light source apparatus 10. The surface light source apparatus 10 includes structure bodies 9. In the surface light source apparatus 10, similarly to the case of the surface light source apparatus 1 of the present embodiment, the main surface 2 has a size of 70 mm in the vertical direction and 70 mm in the horizontal direction. In addition, the surface light source apparatus 10 has a thickness of 2 mm in a direction orthogonal to the main surface 2. The point light source 3 is provided on an end face on the surface light source apparatus 10 so that it osculates the end face. Each structure body 9 is formed in an approximately circular arcuate shape around the point light source 3 as the center. In addition, the structure bodies 9 are concentrically arranged at a pitch p101 (for example, a pitch of 0.3 mm) around the point light source 3 as the center. However, the structure bodies 9 include no configuration corresponding to the cut-off portions as in the present embodiment.

Figure 11:
FIG. 11 is a drawing showing the luminance distribution of the surface light source apparatus according to Embodiment 1.
Figure 44:
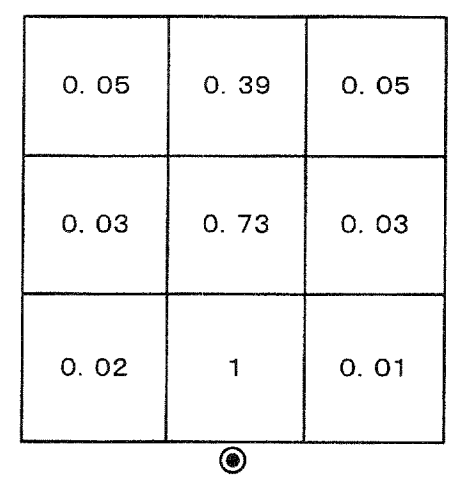

FIG. 11 and FIG. 44 are drawings showing luminance distributions of the surface light source apparatus 1 according to the present embodiment and of the surface light source apparatus 10 including structure bodies having no cut-off portion, respectively. Specifically, each of FIG. 11 and FIG. 44 is a drawing showing the luminance distribution (normalized to have a maximum luminance of 1) for every area on single surface light source apparatus, in a case of that the main surface of the surface light source apparatus is divided into 9 areas. In the case of the surface light source apparatus 10, as shown in FIG. 43A, a bright line F101 occurs, extending from the point light source 3 and passing through a central portion of the surface light source apparatus 10. Therefore, high luminance can be seen on the area where the bright line F101 is extending. On the other hand, in the case of the surface light source apparatus 1 of the present embodiment, as shown in FIG. 11, uniformity of luminance can be seen on the almost whole main surface. Accordingly, the surface light source apparatus 1 having the structure bodies 4 according to the present embodiment can suppress occurrence of a bright line and occurrence of non-uniformity of the luminance distribution, compared with those of the surface light source apparatus 10. Therefore, the surface light source apparatus 1 according to the present embodiment can achieve more improvement of the uniformity of luminance, compared with that of the surface light source apparatus 10.

Figure 12:
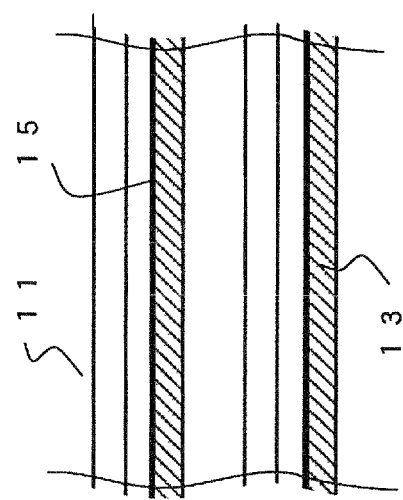
FIG. 12 is a drawing showing the structure bodies when viewed from the main surface side, in a case of the structure bodies having no cut-off portion in the surface light source apparatus according to Embodiment 1.
Figure 13:
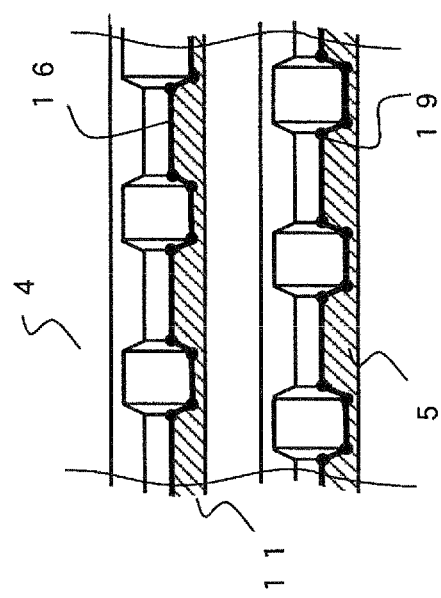
FIG. 13 is a drawing showing the structure bodies when viewed from the main surface side, in a case of the structure bodies having cut-off portions in the surface light source apparatus according to Embodiment 1.
Figure 14:
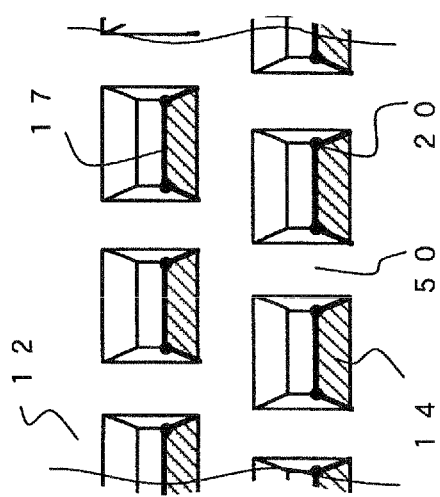
FIG. 14 is a drawing showing the structure bodies when viewed from the main surface side, in a case of the structure bodies being divided by the cut-off portions in the surface light source apparatus according to Embodiment 1.
Figure 15:
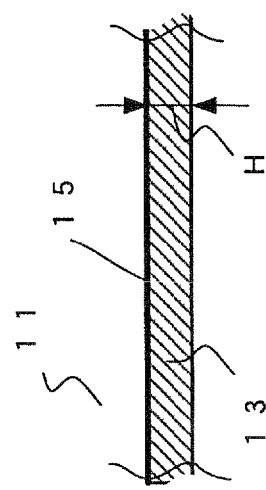
FIG. 15 is a drawing showing the structure body having no cut-off portion in the surface light source apparatus according to Embodiment 1 when viewed from the point light source side.
Figure 16:
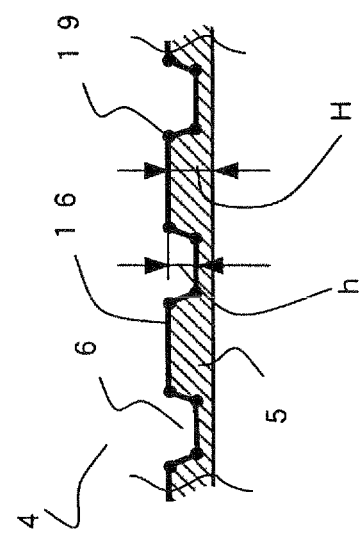
FIG. 16 is a drawing showing the structure body in the surface light source apparatus according to Embodiment 1 when viewed from the point light source side.
Figure 17:
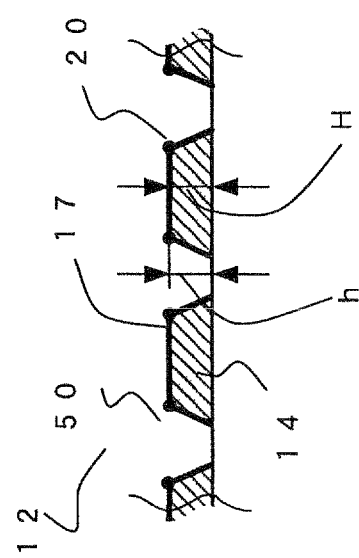
FIG. 17 is a drawing showing the structure body divided by the cut-off portions in the surface light source apparatus according to Embodiment 1 when viewed from the point light source side.

Next, effects brought on optical characteristics of the surface light source apparatus, in cases of that the height h of the cut-off portions of the structure bodies is changed, are described below. FIGS. 12 to 14 are drawings of the structure bodies when viewed from the main surface 2 side. FIG. 12 shows the structure bodies satisfying h=0, i.e., the structure bodies 11 having no cut-off portion 6. FIG. 13 shows the structure bodies satisfying 0<h<H, i.e., the structure bodies 4 having cut-off portions 6. FIG. 14 shows the structure bodies satisfying h=H, i.e., the structure bodies 12 being divided in the longitudinal direction thereof by cut-off portions 50. FIG. 15 is a drawing showing the structure body 11 having no cut-off portion as shown in FIG. 12, when viewed from the point light source side. FIG. 16 is a drawing showing the structure body 4 having the cut-off portions 6 as shown in FIG. 13, when viewed from the point light source side. FIG. 17 is a drawing showing the structure body 12 which is divided as shown in FIG. 14, when viewed from the point light source side.

Figure 18:
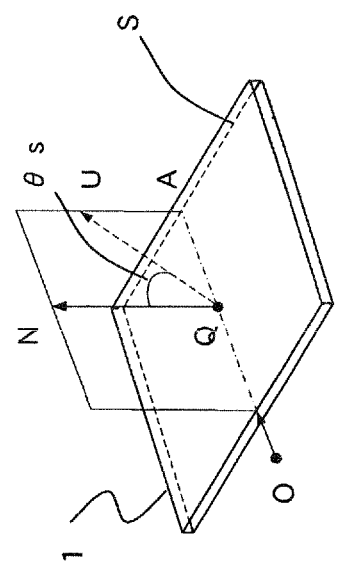
FIG. 18 is a drawing for describing measurement of a luminance-angle characteristic at nearly the central portion on the surface light source apparatus according to Embodiment 1.

FIG. 18 is a drawing for describing measurement of a luminance-angle characteristic at nearly the central portion on the surface light source apparatus 1 according to Embodiment 1. An observation point Q is positioned at nearly the central part of the main surface 2 of the surface light source apparatus 1. The light emitted from the point light source 3 enters into the surface light source apparatus 1 through the end face and is reflected by a structure body 4 at the observation point Q, and the reflected light is in turn emitted. The luminance of the light so emitted is then observed in a QU-direction. Here, an observation angle θs is defined to be the angle between the direction of the normal line N and the QU-direction. The observation angle θs in the A-direction of the line segment OA is set to a positive value, and the observation angle θs in the O-direction of the line segment OA is set to a negative value.

Figure 19:
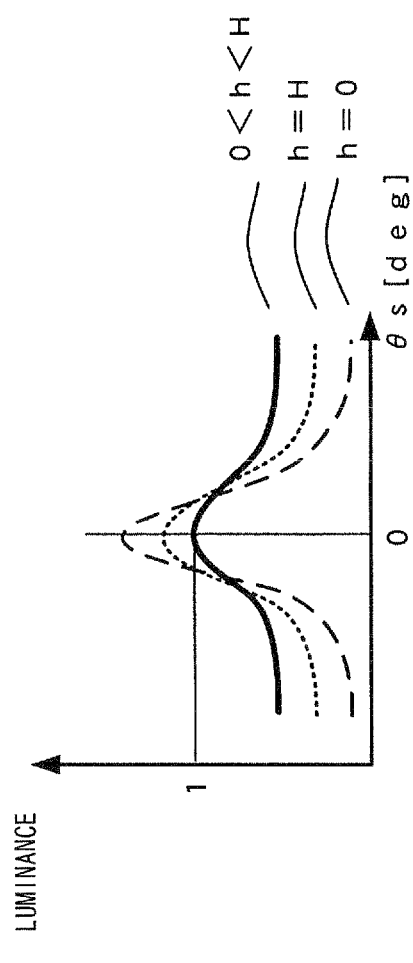
FIG. 19 is a drawing showing the luminance-angle characteristic at nearly the central portion on the surface light source apparatus, the luminance-angle characteristic depending on states of the cut-off portions of the structure bodies of the surface light source apparatus according to Embodiment 1.

FIG. 19 is a drawing showing the luminance-angle characteristic at nearly the central portion on the surface light source apparatus, the luminance-angle characteristic depending on states of the cut-off portions 6 of the structure bodies 4 of the surface light source apparatus 1 according to Embodiment 1. The horizontal axis shows the observation angle θs. The vertical axis shows the luminance for each case of 0<h<H, h=H, and h=0, where the luminance is normalized to have a value of 1 in the case of 0<h<H. In the cases of FIGS. 12, 13, and 14, when the light enters from the point light source 3, the light is reflected by the reflecting surfaces 13, 5, and 14 to the main surface 2 side, respectively. Light which enters to edges 15, 16, and 17 of the respective reflecting surfaces 13, 5, 14 on the main surface side and to vertex portions 19 and 20 of the respective reflecting surfaces 5 and 14 diffuses, respectively. Therefore, as shown in FIG. 19, the structure bodies (the structure bodies shown in FIG. 13), in which the edges and vertex portions on the main surface side exist the most, provides smooth variation of the distribution in the luminance-angle characteristic, resulting in excellence uniformity of luminance.

In the structure bodies 12 of FIG. 14, the reflecting surfaces 14 have a fewer edges and vertex portions of the reflecting surfaces 14 on the main surface side, compared with those of the structure bodies 4 of FIG. 13. Therefore, the emitted light shows high directivity in the front direction. Accordingly, a large difference of the brightness and darkness in luminance arises due to whether or not the structure bodies 12 are provided, resulting in non-uniformity of luminance.

In the structure body 11 of FIG. 12, the reflecting surfaces 13 have a fewer edges and vertex portions of the reflecting surfaces 13 on the main surface side, compared with those of the structure bodies of FIGS. 13 and 14. Therefore, the emitted light shows even higher directivity in the front direction, resulting in non-uniformity of luminance. As a result, the increase and decrease in the height h of the cut-off portions 6 allows the increase and decrease of diffusing portions (edges and vertex portions of the reflecting surfaces on the main surface side). Therefore, it is possible to adjust the directivity of the light emitted from the main surface. In addition, as shown in FIGS. 15 to 17, it is possible to increase and decrease the total area of the reflecting surfaces. Therefore, it is possible to adjust the magnitude of the luminance of the light emitted from the main surface.

Figure 20:
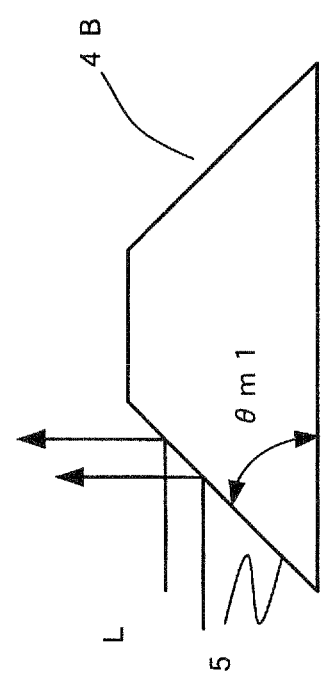
FIG. 20 is a cross-sectional view of the structure body taken along a direction orthogonal to the longitudinal direction of the structure body of the surface light source apparatus according to Embodiment 1, in a case of the cross-section having an approximately trapezoidal shape.
Figure 21:
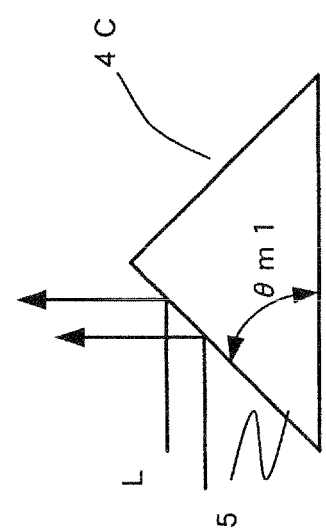
FIG. 21 is a cross-sectional view of the structure body taken along a direction orthogonal to the longitudinal direction of the structure body of the surface light source apparatus according to Embodiment 1, in a case of the cross-section having a triangular shape.
Figure 22:
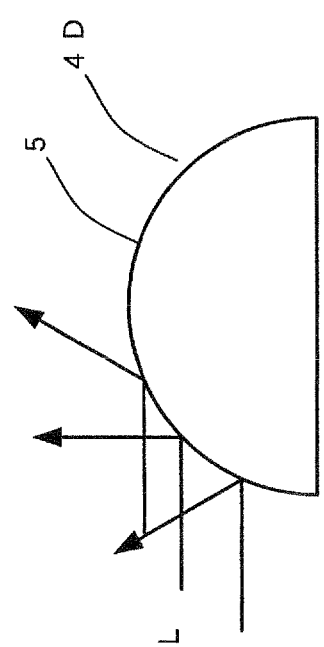
FIG. 22 is a cross-sectional view of the structure body taken along a direction orthogonal to the longitudinal direction of the structure body of the surface light source apparatus according to Embodiment 1, in a case of the cross-section having an approximately circular arcuate shape.
Figure 23:
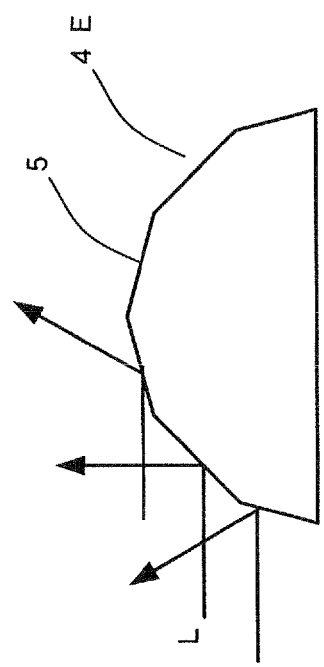
FIG. 23 is a cross-sectional view of the structure body taken along a direction orthogonal to the longitudinal direction of the structure body of the surface light source apparatus according to Embodiment 1, in a case of the cross-section having an approximately polygonal shape.

Next, the behaviors and the luminance-angle characteristics of the reflected light, in cases of that the cross-section of each structure body 4 taken along a direction orthogonal to the longitudinal direction of the structure body 4 is changed, are described as follows. FIGS. 20 to 23 are schematic views illustrating behaviors of the light L propagating inside the surface light source apparatus. FIG. 20 shows a structure body 4B, in which the cross-section taken along a direction orthogonal to the longitudinal direction has an approximately trapezoidal shape. FIG. 21 shows a structure body 4C, in which the cross-section taken along a direction orthogonal to the longitudinal direction has a triangular shape. FIG. 22 shows a structure body 4D, in which the cross-section taken along a direction orthogonal to the longitudinal direction has an approximately circular arcuate shape. FIG. 23 shows a structure body 4E, in which the cross-section taken along a direction orthogonal to the longitudinal direction has an approximately polygonal shape. In the case of the cross-section having an approximately trapezoidal shape as shown in FIG. 20, and in the case of the cross-section having a triangular shape as shown in FIG. 21, the increase and decrease of the angle θm1 of the reflecting surface 5 (See FIG. 7) allows the adjustment of the emission angle and the luminance of the reflected light. In the case of the cross-section having an approximately circular arcuate shape as shown in FIG. 22, and in the case of the cross-section having an approximately polygonal shape as shown in FIG. 23, the reflected light is diffused in various directions.

Figure 24:
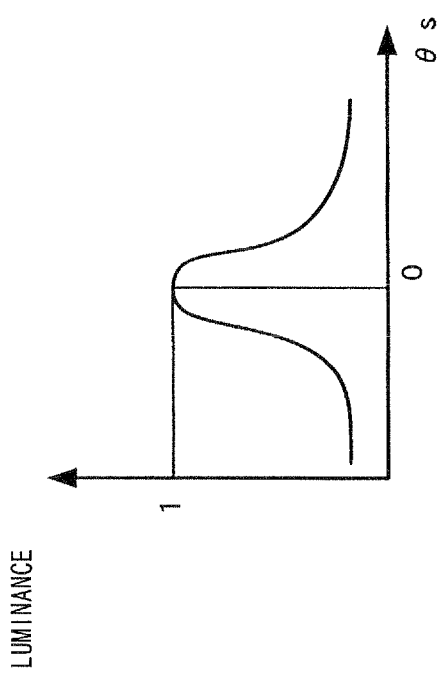
FIG. 24 is a drawing showing the luminance-angle characteristic, in a case of that the cross-section taken along a direction orthogonal to the longitudinal direction of the structure body of the surface light source apparatus according to Embodiment 1 has an approximately trapezoidal shape.
Figure 25:
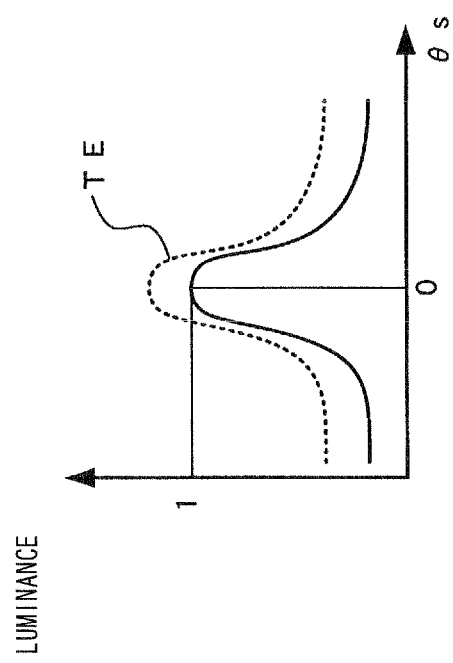
FIG. 25 is a drawing showing the luminance-angle characteristic, in a case of that the cross-section taken along a direction orthogonal to the longitudinal direction of the structure body of the surface light source apparatus according to Embodiment 1 has a triangular shape.
Figure 26:
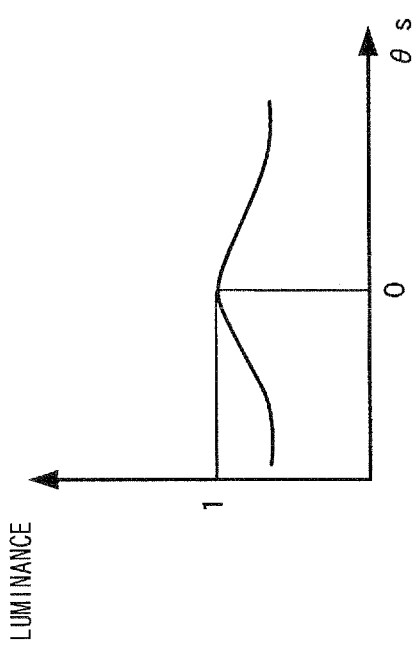
FIG. 26 is a drawing showing the luminance-angle characteristic, in cases of that the cross-section taken along a direction orthogonal to the longitudinal direction of the structure body of the surface light source apparatus according to Embodiment 1 has an approximately circular arcuate shape and has an approximately polygonal shape.

FIGS. 24 to 26 show luminance-angle characteristics in the cases of the cross-sections having various shapes. In the luminance-angle characteristics of FIGS. 24 to 26, the horizontal axes show the observation angle θs, and the vertical axes show the luminance, which is normalized to have a value 1 in a case of θs=0. FIG. 24 shows a luminance-angle characteristic in a case of the cross-section having an approximately trapezoidal shape as shown in FIG. 20, the cross-section taken along a direction orthogonal to the longitudinal direction of the structure body. FIG. 25 shows a luminance-angle characteristic in a case of the cross-section having a triangular shape. FIG. 26 shows a luminance-angle characteristic, in cases of the cross-section having an approximately circular arcuate shape and of the cross-section having an approximately polygonal shape as shown in FIG. 22 or 23, respectively. In cases of the cross-section having an approximately trapezoidal shape and a triangular shape as shown in FIGS. 24 and 25, sharp directivity of the reflected light is provided. In a case where the angle θm of the reflected surface is set to a predetermined angle, when viewed from the main surface side, the area on which the structure bodies having a triangular shape are present is smaller than that of the area on which the structure body having an approximately trapezoidal shape is provided. Accordingly, more structure bodies can be arranged in the surface light source apparatus in the case of the cross-section of a triangular shape than in the case of an approximately trapezoidal shape. Therefore, the absolute value of the luminance can be increased as shown by the curve TE in FIG. 25. In the cases of the cross-sections having an approximately circular arcuate shape and an approximately polygonal shape, the degree in diffusion of the reflected light is high. Therefore, as shown in FIG. 26, the emitted light has lower directivity, compared with the cases of the cross-sections having a triangular shape or a trapezoidal shape.

In Embodiment 1, a surface light source apparatus, in which the structure bodies are formed in an approximately circular arcuate shape and concentrically arranged, is described as an example. However, arrangement of the structure bodies, or the physical shape and the dimension of the structure bodies and the surface light source apparatus may be freely set up in the design, alternatively to the configuration described in Embodiment 1. For example, the pitch between the structure bodies and the width, height, and so on of the cut-off portions of a structure bodies may be partially changed according to the disposing positions of the structure bodies on the surface light source apparatus. In addition, the number of the light sources is not limited to the example as described above, but may be changed according to the intended use. Moreover, in the case of FIG. 22, the cross-sectional shape of the cross-section taken along a direction orthogonal to the longitudinal direction of the structure body 4D forms a part of a circular arc. However, this cross-sectional shape may form another part of a circular arc such as a semicircle. Further, the cross-sectional shapes shown in FIGS. 20 to 23 are not limited to the shapes described above, but may be a shape of a combination of a trapezoidal shape, a triangular shape, a circular arcuate shape, and a polygonal shape.

In Embodiment 1, the structure bodies are formed on one face on the surface light source apparatus. However, the structure bodies may be formed on two or more faces on the surface light source apparatus. For example, the structure bodies may be formed not only on the main surface but also on a surface disposed opposite to the main surface in the surface light source apparatus.

In the surface light source apparatus of Embodiment 1, the structure bodies 4 of an approximately circular arcuate shape is concentrically arranged around the point light source 3 as a reference point (center). However, the structure bodies 4 may be concentrically arranged around another position as a reference point (center) distant from the point light source 3. In this case, similar effects as the surface light source apparatus of Embodiment 1 can also be obtained.

Embodiment 2

Figure 27:
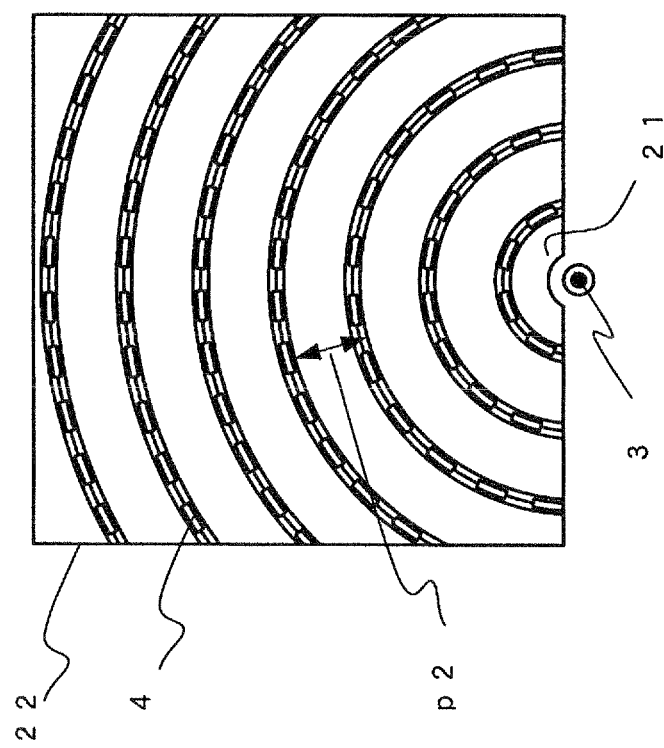
FIG. 27 is a plan view of a surface light source apparatus according to Embodiment 2.

A surface light source apparatus according to Embodiment 2 is described with reference to the drawings. The same or similar elements as in Embodiment 1 may be appropriately denoted by the same reference numerals as in Embodiment 1. FIG. 27 is a plan view of the surface light source apparatus 22 according to Embodiment 2. The surface light source apparatus 22 according to Embodiment 2 includes a light-entering cut-off portion 21 through which the light emitted from the point light source 3 enters into the surface light source apparatus 22. That is, the light-entering cut-off portion 21 is formed in a recessed shape on an incident surface of the surface light source apparatus 22. The light-entering cut-off portion 21 is formed on the incident surface of the surface light source apparatus 22 in a circular arcuate shape around the point light source 3 as the center. In the surface light source apparatus 22 according to Embodiment 2, similarly to the surface light source apparatus 1 of Embodiment 1, the main surface 2 of the surface light source apparatus 22 has a size of 70 mm in the vertical direction and 70 mm in the horizontal direction. In addition, the surface light source apparatus 22 has a thickness of 2 mm in a direction orthogonal to the main surface 2. Structure bodies 4 are concentrically arranged at a pitch p2 (for example, a pitch of 0.3 mm) around one point light source 3 as the center. The diffraction state of the light entering from the point light source 3 into the surface light source apparatus 22 through the light-entering cut-off portion 21 is changed. Therefore, the shape such as the height of the structure bodies 4 according to Embodiment 2 differs from that of the structure bodies 4 according to Embodiment 1.

Figure 28:
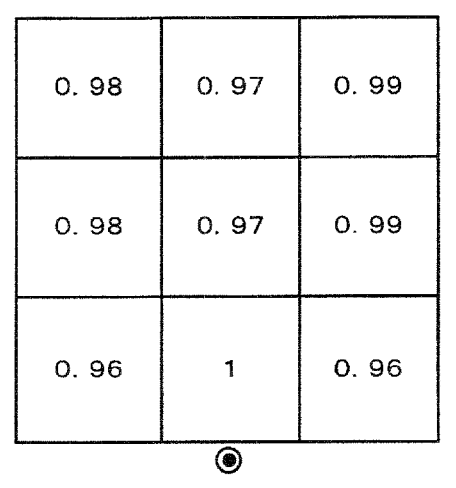

FIG. 28 is a drawing showing luminance distribution of the surface light source apparatus 22. When the light emitted from the point light source 3 enters into the surface light source apparatus 22 through the end face on the light-entering cut-off portion 21, the light is diffracted in various directions. That is, the light which entered into the surface light source apparatus 22 spreads in various directions. Therefore, the propagation efficiency of the light propagating to the entire surface light source apparatus 22 can be improved, and the light can be uniformly emitted from the main surface. Accordingly, further improvement of the uniformity of luminance on the almost entire main surface of the surface light source apparatus 22 can be achieved. Therefore, when the surface light source apparatus 22 having the structure bodies 4 emits light, occurrence of a bright line and occurrence of non-uniformity of the luminance distribution can be suppressed, compared with the case of that the surface light source apparatus having no light-entering cut-off portion 21 emits light. Thus, the surface light source apparatus 22 according to the present embodiment can uniformalize the distribution of the luminance.

In this embodiment, although the light-entering cut-off portion 21 is formed in an approximately circular arcuate shape around the point light source 3 as the center, it may be formed in a polygonal shape. In this case, the light entering into the surface light source apparatus 22 can also be diffracted in various directions.

Embodiment 3

Figure 29:
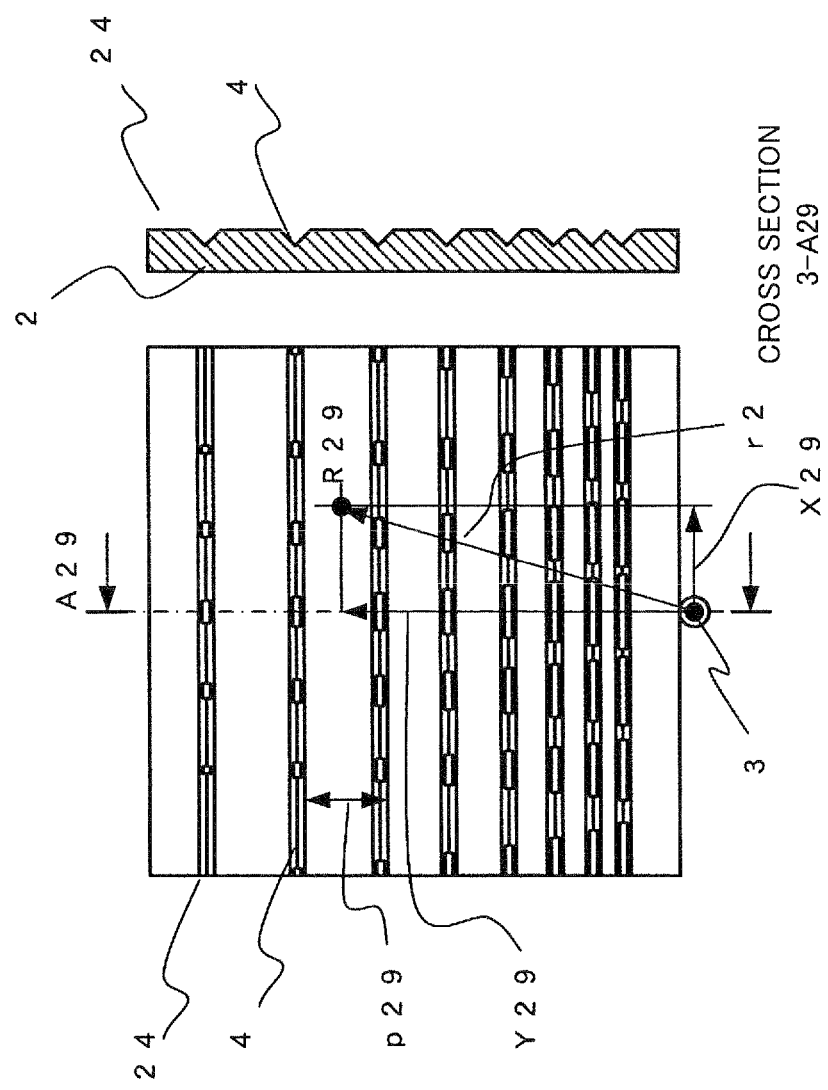
FIG. 29A is a plan view of the surface light source apparatus according to Embodiment 3.
FIG. 29B is a cross-sectional view (3-A29) of the surface light source apparatus according to Embodiment 3.

A surface light source apparatus according to Embodiment 3 is described with reference to the drawings. FIG. 29A is a plan view of the surface light source apparatus according to Embodiment 3. FIG. 29B is a cross-sectional view (3-A29) of the surface light source apparatus according to Embodiment 3 when viewed from the point light source side. In Embodiment 3, the surface light source apparatus 24 includes structure bodies 4 formed in an approximately linear shape, and is arranged in parallel at a predetermined pitch. The main surface 2 of the surface light source apparatus 24 has a size of 70 mm in the vertical direction and 70 mm in the horizontal direction. In addition, the surface light source apparatus 24 has a thickness of 2 mm in a direction orthogonal to the main surface 2. One point light source 3 is provided on an end face of the surface light source apparatus 1 so that it osculates the end face. The reference numeral X29 indicates the distance to an arbitrary point R29 on the surface light source apparatus 24 in the width direction, and the reference numeral Y29 indicates the distance in the normal direction of the structure bodies 4. As described above, because the structure bodies 4 are formed in an approximately linear shape, it is possible to facilitate the formation of the structure bodies 4 by machine cutting and the like.

Figure 30:
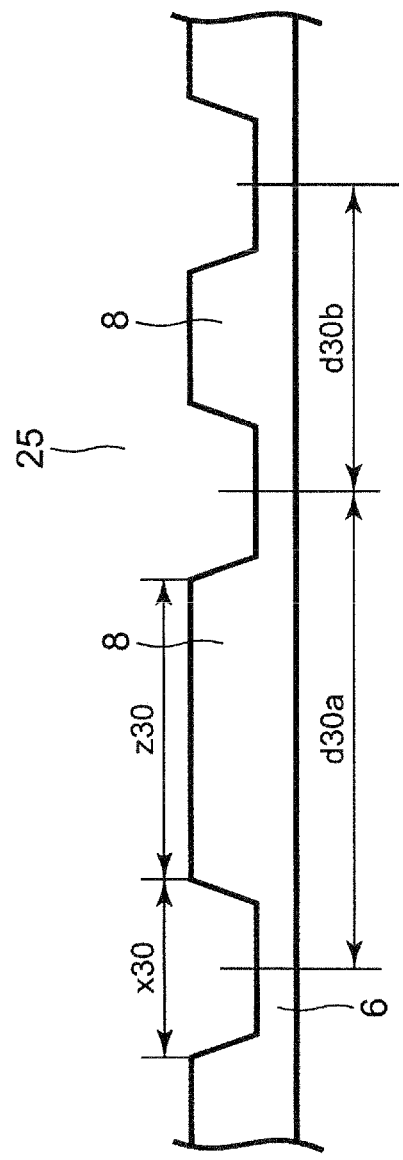
FIG. 30 is a drawing showing the surface light source apparatus according to Embodiment 3 when viewed from the point light source side.
Figure 31:
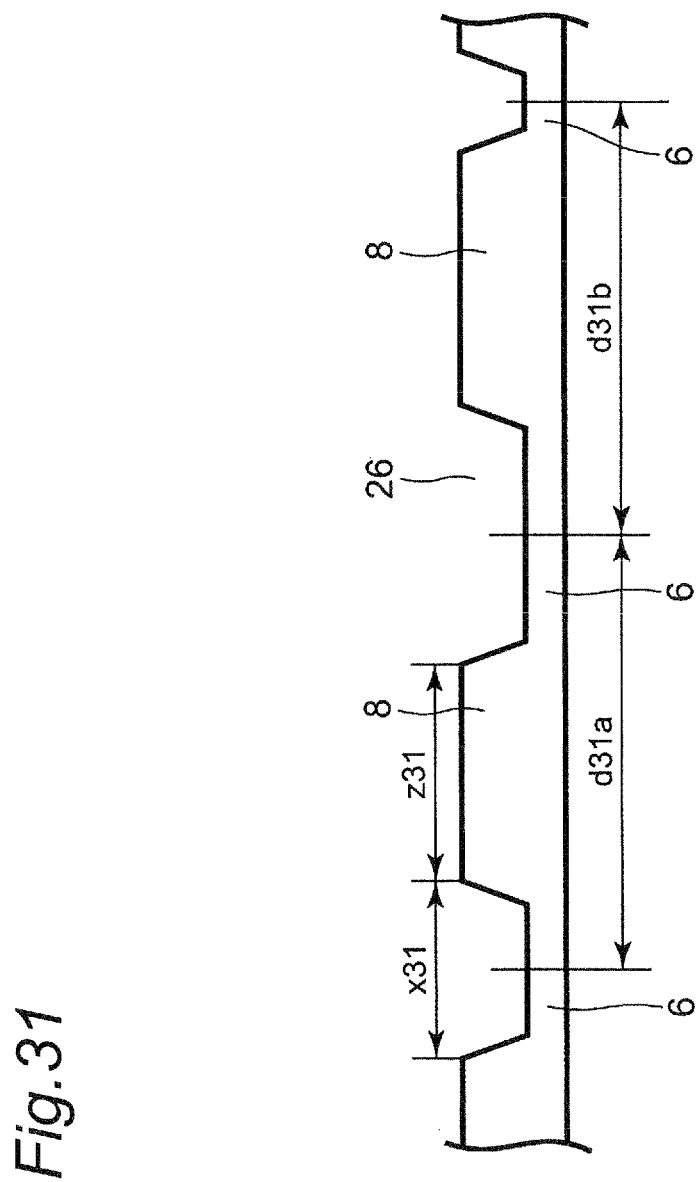
FIG. 31 is a drawing showing the surface light source apparatus according to Embodiment 3 when viewed from the point light source side.

In the surface light source apparatus 24 according to Embodiment 3, there are two types of the structure bodies 4. The two types of the structure bodies are provided in predetermined rules. FIGS. 30 and 31 are drawings showing two types of the structure bodies 25 and 26 when viewed from the point light source 3 side. Each structure body 25 shown in FIG. 30 includes cut-off portions 6 with a fixed length x30, where the positions of the cut-off portions 6 are variable (d30a can be not equal to d30b, as shown in FIG. 30). In addition, the cut-off remaining portions 8 have a length z30. Each structure body 26 of FIG. 31 includes cut-off portions 6 having a length x31 which is variable. The position of the cut-off portions is uniform (d31a=d31b, as shown in FIG. 31). In addition, the cut-off remaining portions 8 have a length z31.

Figure 32:
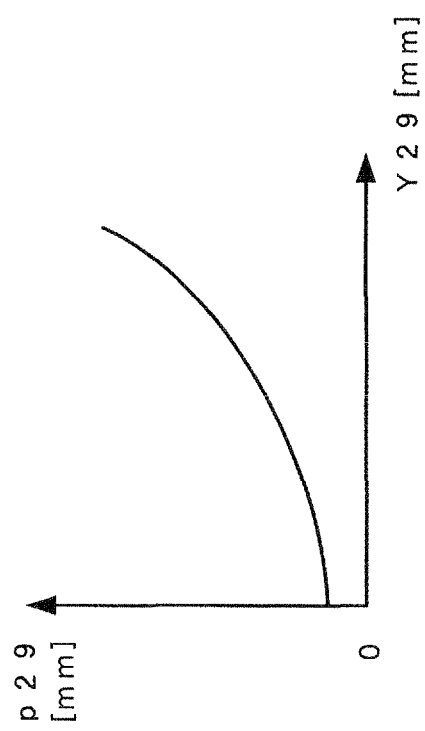
FIG. 32 is a drawing showing relationship between the distance to the structure bodies in the normal direction and the pitch of the structure bodies of the surface light source apparatus according to Embodiment 3.
Figure 33:
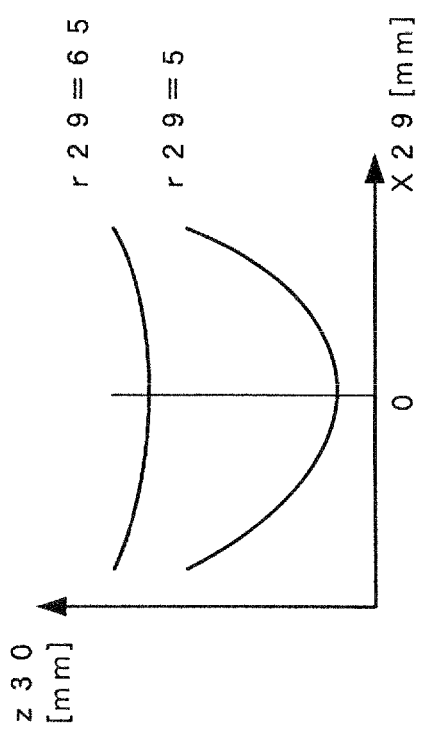
FIG. 33 is a drawing showing relationship between the distance to an arbitrary point on the surface light source apparatus according to Embodiment 3 in the width direction and the length of cut-off remaining portions of the structure bodies.
Figure 34:
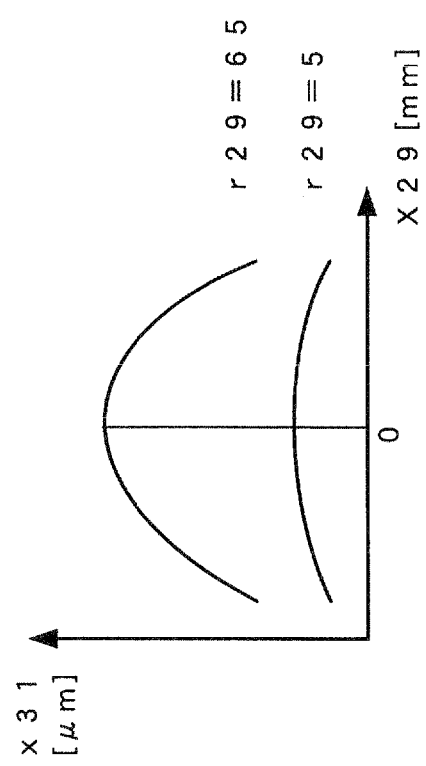
FIG. 34 is a drawing showing relationship between the distance to an arbitrary point on the surface light source apparatus according to Embodiment 3 in the width direction and the length of the cut-off portions of the structure bodies.

FIGS. 32 to 34 are drawings showing shapes and changes of arrangements of the structure bodies 4 (25, 26) in the surface light source apparatus 24 according to Embodiment 3.

More precisely, FIG. 32 is a drawing showing relationship between the distance Y29 in the normal direction of the structure bodies 4 and the pitch p29 of the structure bodies 4 of the surface light source apparatus 24 according to Embodiment 3. The horizontal axis shows the distance Y29 to an arbitrary point R29 on the surface light source apparatus 24 in the normal direction of the structure bodies 4. In addition, the vertical axis shows the pitch p29 of the structure bodies 4. The pitch p29 becomes larger as the distance from the point light source 3 becomes larger.

FIG. 33 is a drawing showing relationship between the distance X29 to an arbitrary point R29 on the surface light source apparatus 24 according to Embodiment 3 in the width direction and the length z30 of the cut-off remaining portions 8 of the structure bodies 4 (25). The horizontal axis shows the distance X29 to an arbitrary point R29 on the surface light source apparatus 24 in the width direction. In addition, the vertical axis shows the length z30 of the cut-off remaining portions 8 of the structure bodies 4. With regard to the structure bodies 4 (25) at positions close to the point light source 3 (positions with small r29), the length z30 of the cut-off remaining portions 8 becomes larger as the absolute value of the distance X29 to an arbitrary point R29 on the surface light source apparatus 24 in the width direction becomes larger, in other words, as the point R29 becomes more distant from the point light source 3 (central position). This improves the efficiency of the emission from the main surface 2 of the light propagating inside the surface light source apparatus 24. On the other hand, with regard to the structure bodies 4 (25) at positions distant from the point light source 3 (positions with large r29), the length z30 of the cut-off remaining portions 8 is almost constant, and this allows uniform emission to the main surface 2 of the light propagating inside the surface light source apparatus 24.

FIG. 34 is a drawing showing relationship between the distance X29 to an arbitrary point R29 on the surface light source apparatus 24 according to Embodiment 3 in the width direction and the length x31 of the cut-off portions 6 of the structure bodies 26. The horizontal axis shows the distance X29 to an arbitrary point R29 on the surface light source apparatus 24 in the width direction. In addition, the vertical axis shows the length x31 of the cut-off portions 6 of the structure bodies 26. With regard to the structure bodies 4 (26) at positions close to the point light source 3 (positions with small r29), the length x31 of the cut-off portions 6 becomes more approximately constant as the absolute value of the distance X29 to an arbitrary point R29 on the surface light source apparatus 24 in the width direction becomes larger, in other words, as the point R29 becomes more distant from the point light source 3 (central position). Therefore, uniform emission from the main surface 2 of the light propagating inside the surface light source apparatus 24 can be achieved. On the other hand, with regard to the structure bodies 4 (26) at positions distant from the point light source 3 (positions with large r29), the length x31 of the cut-off portions 6 becomes smaller as the absolute value of the distance X29 of an arbitrary point R29 on the surface light source apparatus 24 in the width direction becomes larger, in other words, as the point. R29 becomes more distant from the point light source 3 (central position). Therefore, the efficiency of the emission from the main surface 2 of the light propagating inside the surface light source apparatus 24 can be improved.

In Embodiment 3, the surface light source apparatus 24, in which the structure bodies 4 are formed in an approximately linear shape and are arranged in parallel, is described as an example. However, arrangement of the structure bodies, and the physical shape and the dimension of the structure bodies and the surface light source apparatus can be freely set up in the design. For example, the structure bodies 4 may be formed in an approximately circular arcuate shape. In addition, the shape and the dimension of the cut-off portions 6 and cut-off remaining portions 8 may be the same as those described in Embodiment 1. The number of the light sources is not limited to the example as described above, but may be changed according to the intended use. In addition the structure bodies 4 may have cross-sections described in anyone of FIGS. 20 to 23, or cross-section of a combination of the ones described in FIGS. 20 to 23.

Embodiment 4

Figure 35:
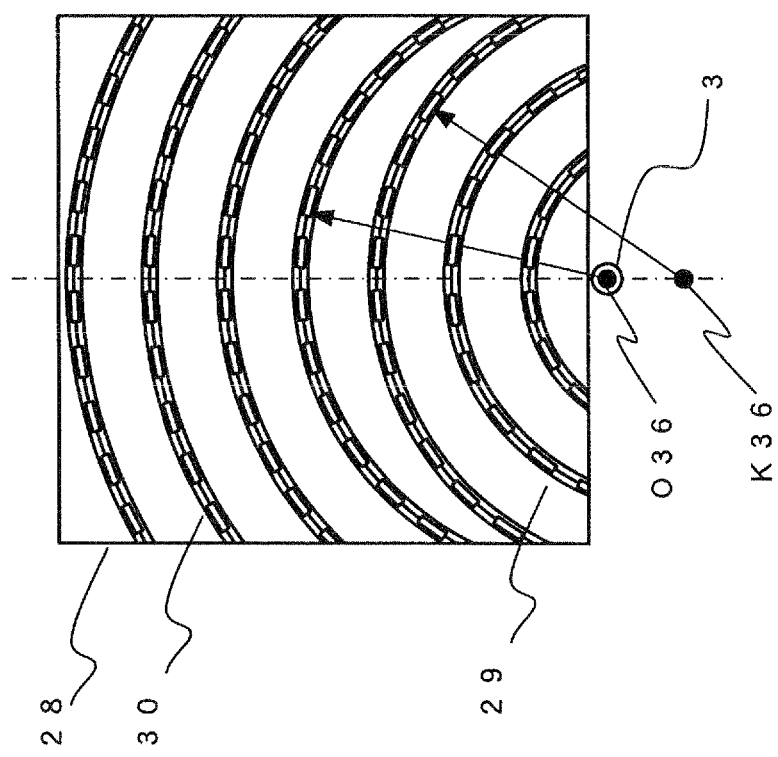
FIG. 35 is a drawing showing a surface light source apparatus according to Embodiment 4.

A surface light source apparatus according to Embodiment 4 is described with reference to the drawings. FIG. 35 is a drawing showing a surface light source apparatus 28 according to Embodiment 4. The surface light source apparatus 28 includes structure bodies 4. Each structure body 4 is concentrically arranged in a circular arcuate shape, and in this case, its central point (reference point) is shifted according to the distance from the point light source 3. The structure bodies 29 arranged near the point light source 3 are, around a reference point k36 as the central point, formed in a circular arcuate shape and concentrically arranged. On the other hand, the structure bodies 30 arranged distant from the point light source 3 are, around the point light source 3 as the central point O36, formed in a circular arcuate shape and concentrically arranged. The surface light source apparatus 28 has the same dimension as that of the surface light source apparatus 1 of Embodiment 1. As shown in FIG. 35, the central point of the circular arc is shifted from the reference point k36 according to the distance from the point light source 3. This leads the reduction in the light amount of the emitted light on a region on which the structure bodies 29 are arranged, and also leads the increase in the light amount of the emitted light on a region on which the structure bodies 30 are arranged. That is, it is possible to adjust the light amount of the emitted light for every predetermined region.

The configuration of Embodiment 4 may be combined with the configurations disclosed in Embodiments 1 to 3, as necessary: In addition, the shape of the structure bodies is not limited to be a circular arcuate shape, but may be a rectangular shape or a spiral shape.

Embodiment 5

A surface light source apparatus according to Embodiment 5 is described with reference to the drawings. The surface light source apparatus according to Embodiment 5 is capable of displaying characters or figures.

Figure 36:
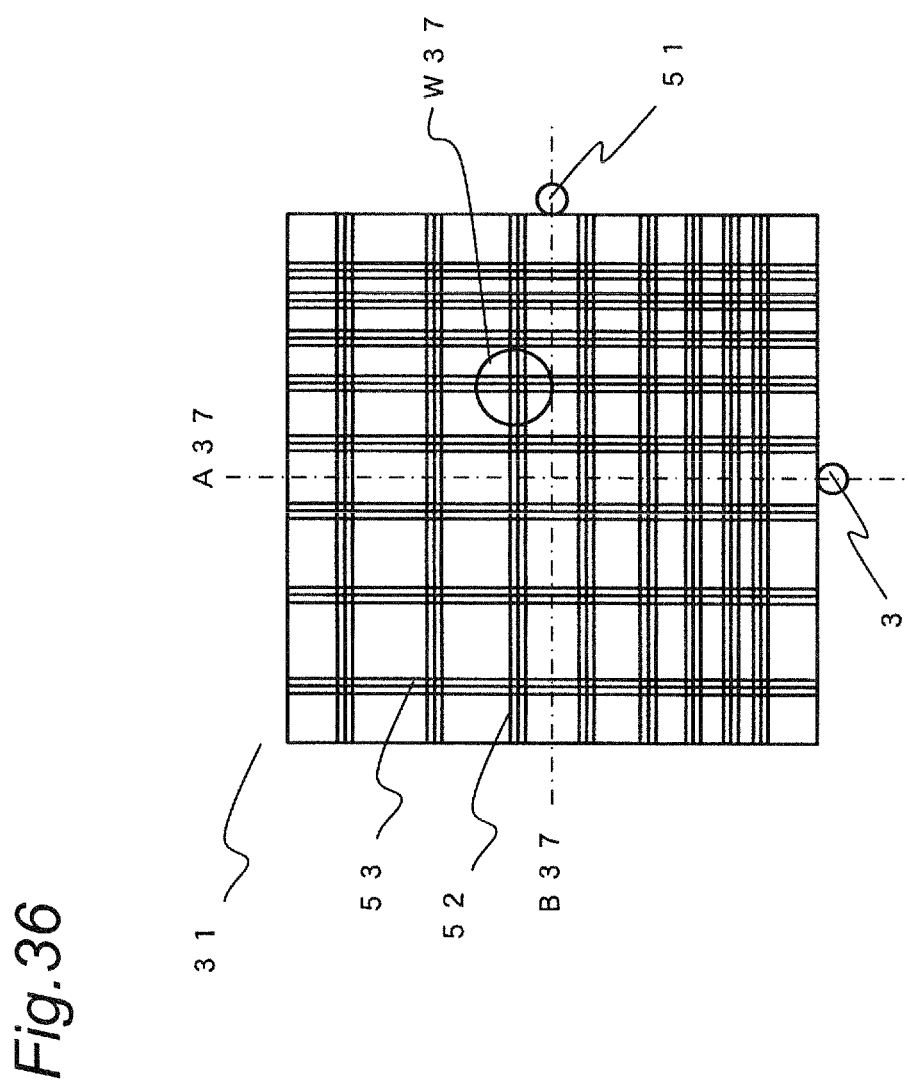
FIG. 36 is a plan view of a surface light source apparatus according to Embodiment 5.

FIG. 36 is a plan view of the surface light source apparatus 31 according to Embodiment 5. The surface light source apparatus 31 in Embodiment 5 has two point light sources 3 and 51. The point light sources 3 is disposed on an end face, and the point light sources 51 is disposed on another end face. Here the two end faces are not facing to each other. In addition, the surface light source apparatus 31 includes structure bodies 52 and structure bodies 53 which are arranged in directions orthogonal to each other. The structure bodies 53 are arranged in a direction (a direction of a line A37) orthogonal to the end face on which the point light source 3 is disposed. The structure bodies 52 are arranged in a direction (a direction of a line B37) orthogonal to the end face on which the point light source 51 is disposed. The surface light source apparatus 31 has the same dimension (size and thickness) as that of the surface light source apparatus 1 of Embodiment 1.

Figure 37:
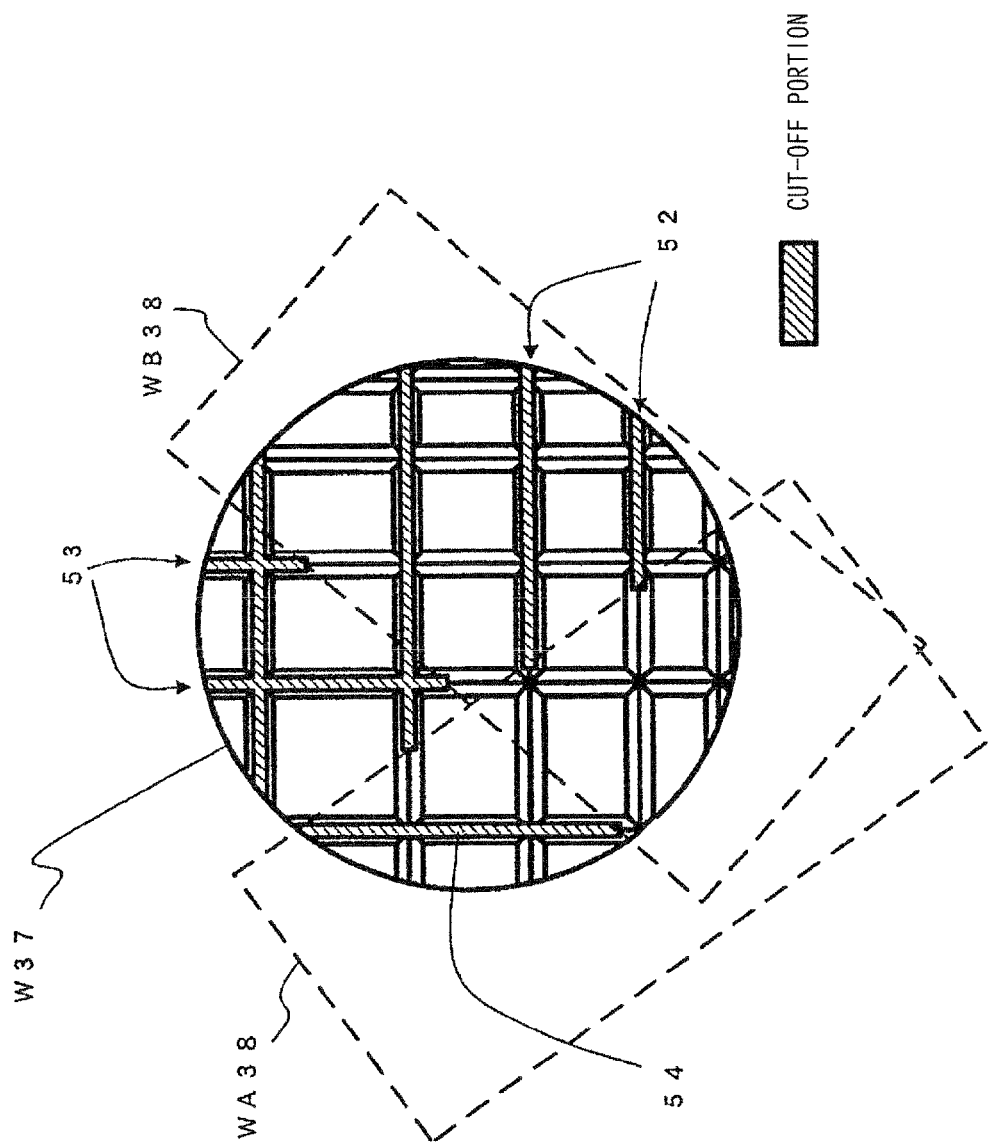
FIG. 37 is an enlarged view of a region W37 on the surface light source apparatus according to Embodiment 5.

FIG. 37 is an enlarged view of a certain region W37 on the surface light source apparatus 31. A region WA38 is a region which should strongly shine by the light from the point light source 3. A region WB38 is a region which should strongly shine by the light from the point light source 51. Both of the structure bodies 52 and the structure bodies 53 are formed in the surface light source apparatus 31. Only the cut-off portions 54 are formed on a region on which neither the region WA38 relevant to the structure bodies 52 nor the region WB38 relevant to the structure bodies 53 is provided.

Figure 38:
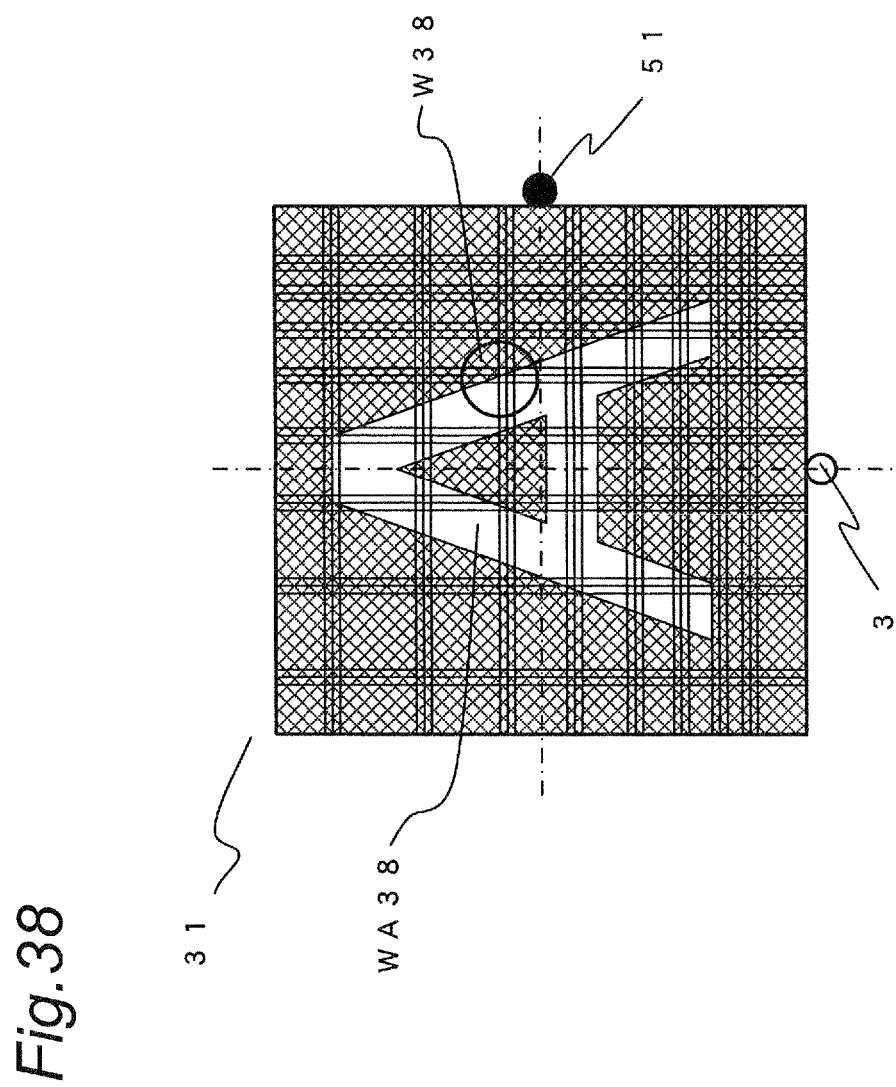
FIG. 38 is a drawing showing the surface light source apparatus when the point light source 3 according to Embodiment 5 emits light.
Figure 39:
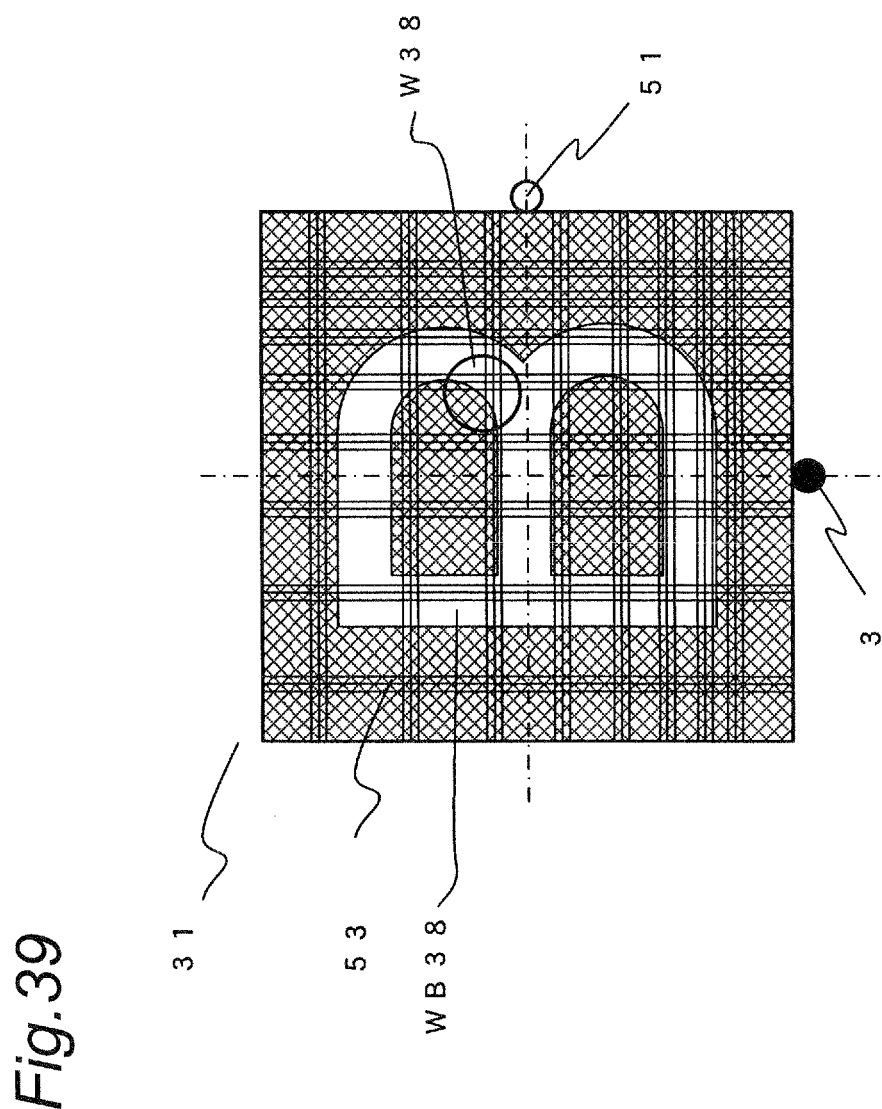
FIG. 39 is a drawing showing the surface light source apparatus when the point light source 51 according to Embodiment 5 emits light.

FIG. 38 is a drawing showing a state of that the point light source 3 of the surface light source apparatus 31 according to Embodiment 5 emits light. FIG. 39 is a drawing showing a state of that the point light source 51 of the surface light source apparatus 51 according to Embodiment 5 emits light. The surface light source apparatus 31 causes the light to be reflected only on a certain structure bodies disposed on a region forming a character so that the reflected light is emitted, and therefore it can display the character. In Embodiment 5, the region forming a character with respect to the light from the point light source 3 is the region indicated with WA38 (character "A" as in FIG. 38), and the region forming a character with respect to the light from the point light source 51 is the region indicated with WB38 (character "B" as in FIG. 39). Switching the lighting between the two point light sources 3 and 51 allows the display of different characters.

Figure 40:
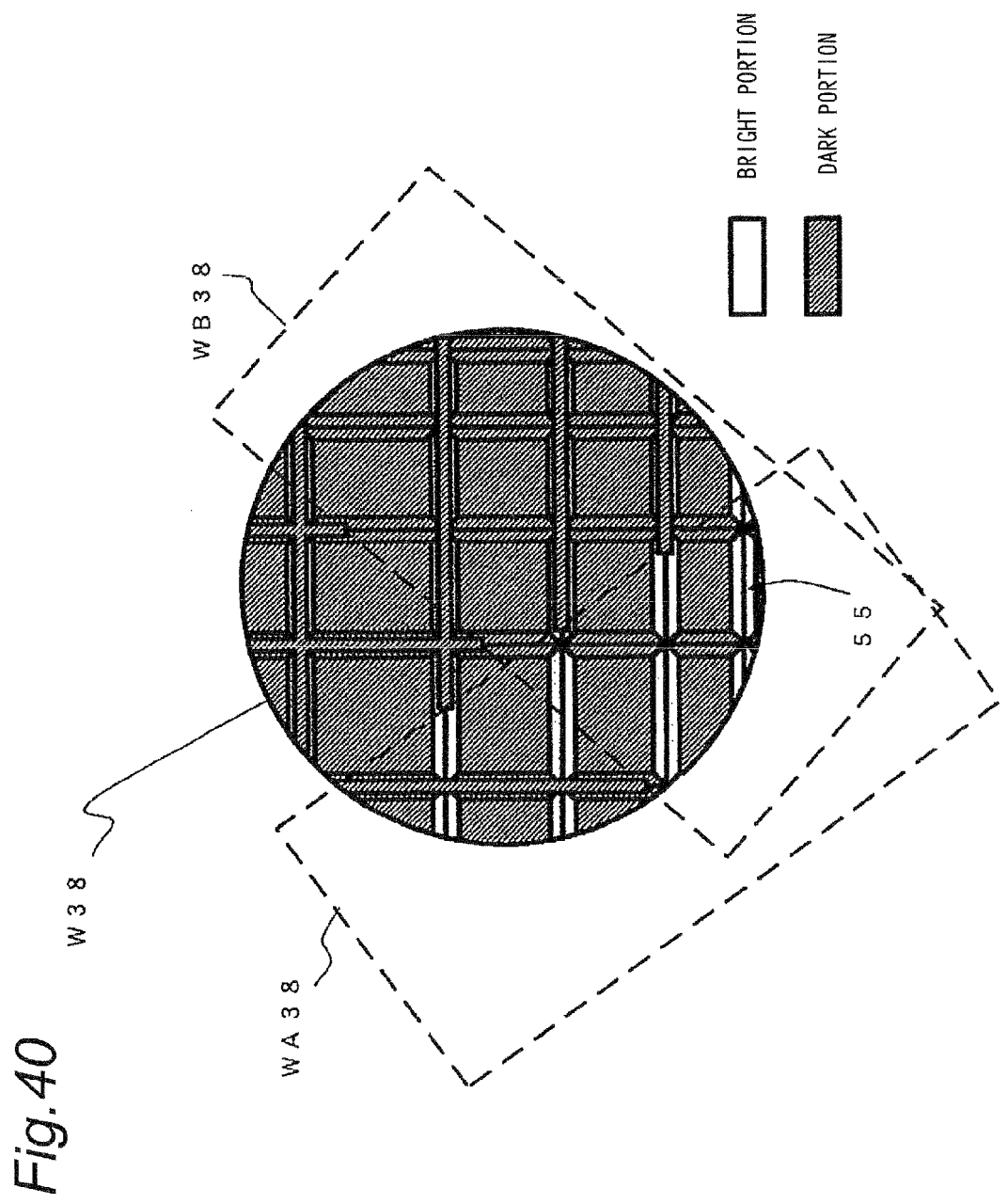
FIG. 40 is an enlarged view of a region W38 on the surface light source apparatus when the point light source 3 according to Embodiment 5 emits light.
Figure 41:
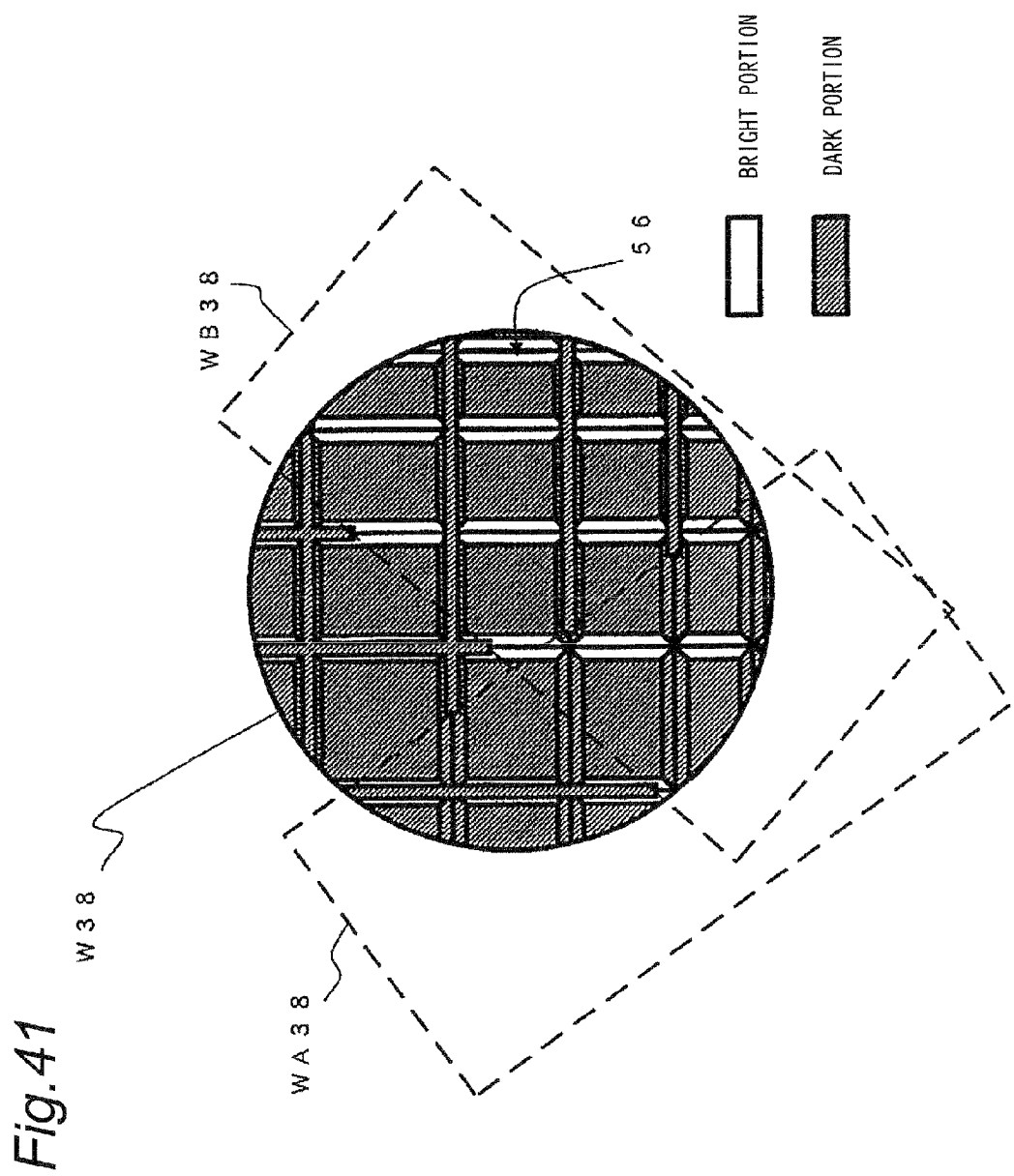
FIG. 41 is an enlarged view of the region W38 on the surface light source apparatus when the point light source 51 according to Embodiment 5 emits light.

FIG. 40 is an enlarged view illustrating the region W38 of FIG. 38. On the region WA38, there are many cut-off remaining portions 55 formed on the structure bodies 52, compared with the other region. When the point light source 3 emits light, the reflecting surfaces (white part shown in FIG. 40) on the cut-off remaining portions 55 shine. Accordingly, the entire region WA38 shines, displaying the character "A" as shown in FIG. 38. FIG. 41 is an enlarged view illustrating the region W38 of FIG. 39. On the region WB38, there are many cut-off remaining portions 56 formed on the structure bodies 38, compared with other region. When the point light source 51 emits light, the reflecting surfaces (white part shown in FIG. 41) on the cut-off remaining portions 56 shine. Accordingly, the entire region WB38 shines, displaying the character "B" as shown in FIG. 39. As described above, the lighting of the point light source 3 results in the display of the character "A", and the lighting of the point light source 51 results in the display of the character "B".

In Embodiment 5, characters are displayed. However, for example, symbols, patterns, etc. other than characters may be displayed.

In addition, in Embodiment 5, the two point light sources 3 and 51 and the two types of the structure bodies 52 and 53 arranged in two directions are provided. However, three or more types of point light sources and respectively corresponding structure bodies can be provided, and the switching of the lighting among the point light sources allows the switchable display of three or more characters, symbols, etc.

In Embodiment 5, the surface light source apparatus compatible with two point light sources is described. However, technical concepts of the present embodiment can be applied to cases of that just one type of point light source or three or more types of point light source(s) are employed.

In Embodiment 5, the surface light source apparatus has a main surface of a rectangular shape, and it has a rectangular parallelepiped shape with a small size in a thickness direction. However, the surface light source apparatus is not limited to have a rectangular parallelepiped shape, but may have a polyhedral shape with four or more end faces, and moreover, point light sources may be disposed on every such end faces. In this case, the shape of structure bodies can be determined corresponding to point light sources disposed on every end faces and such structure bodies can be arranged, and therefore, it is possible to display characters, figures, etc.

Here, the number of characters, figures, etc. can be corresponding to the number of the end faces on which the point light sources are provided.

In addition, the surface light source apparatus of Embodiment 5 displays characters, figures, etc. by the emitted light from the main surface. However, the surface light source apparatus is not be limited to the one that displays what forms shapes of characters, figures, etc., but may be a surface light source that emits light from the almost entire main surface. For example, in the surface light source apparatus according to an aspect as shown in FIG. 36, a first light source capable of emitting light having a certain wavelength may be disposed on a predetermined end face on the surface light source apparatus, and a second light source capable of emitting light having a different wavelength may be disposed on a different end face. In this example, structure bodies orthogonal to the first light source can efficiently reflect light emitted from the first light source to emit the reflected light. In addition, another structure bodies orthogonal to the second light source can efficiently reflect light emitted from the second light source to emit the reflected light. It is possible to apply the configurations described in Embodiments 1 to 4 to the configuration of the structure bodies in this example.

Embodiment 6

As Embodiment 6, a display device using the surface light source apparatus according to Embodiments 1 to 5 is described.

Figure 42:
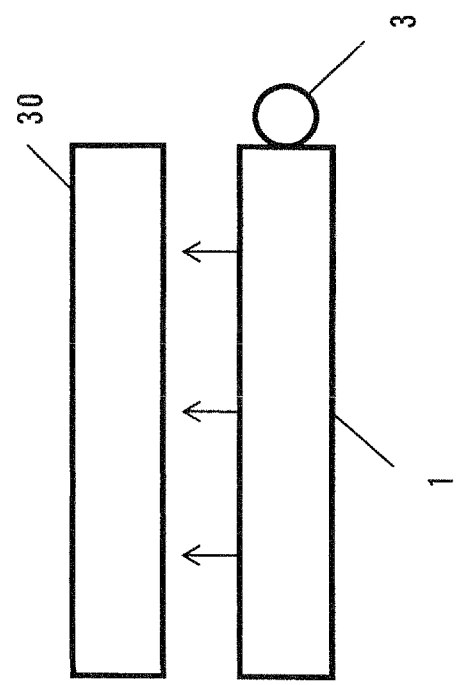
FIG. 42 is a drawing showing a configuration of a display device according to Embodiment 6.

FIG. 42 is a block drawing showing an example of a configuration of a liquid-crystal display device. The liquid crystal display device includes a liquid crystal panel 30, a light source 3 configuring a backlight device for the liquid crystal panel 30, and a surface light source apparatus 1 of Embodiment 1. The surface light source apparatus is not limited to the surface light source apparatus 1 according to Embodiment 1, but may be a surface light source apparatus according to any of the Embodiments 2 to 4. Therefore, occurrence of a bright line and occurrence of non-uniformity of the luminance distribution on an image displayed on the liquid crystal panel 30 can be suppressed, and the luminance can be uniformalized. Therefore, any optical sheet such as a diffusion sheet for suppressing a bright line or the non-uniformity of luminance is not provided on the liquid crystal display device of the present embodiment.

2. Effect, etc.

The surface light source apparatus 1 according to the present disclosure takes in light emitted from a point light source 3 through an end face, and emits the light. A plurality of structure bodies 4 are formed on an opposed surface 21 disposed opposite to a main surface 2. Each structure body 4 has a reflecting surface 5 which faces the point light source 3. Each structure body 4 has a cut-off portion 6 which removes a portion on the reflecting surface in a longitudinal direction of the structure body and in a height direction.

Therefore, occurring of a bright line within the main surface 2 and non-uniformity of the luminance distribution can be suppressed, and thus, no optical sheet such as diffusion sheet is required.

As described in the embodiments, each structure body 4 may be formed on the opposed surface 21 in an approximately linear shape.

This facilitates formation of the structure bodies 4 by machine cutting, etc.

In addition, as described in Embodiments 1 to 3, each structure body 4 may be formed on the opposed surface 21 in an approximately circular arcuate shape around the point light source 3 as a center.

This achieves improvement in the emission efficiency of the light from the main surface 2.

In addition, as described in each of the embodiments, when the cut-off portion 6 is viewed from the point light source 3 side, the cut-off portion 6 may be formed in an approximately trapezoidal shape.

Therefore, the light propagating inside the surface light source apparatus is reflected by the side surface of the cut-off portion 6 which has an approximately trapezoidal shape, and the light can be emitted from the main surface 2. This achieves improvement in emission efficiency of the light.

In addition, as described as an example in Embodiment 1, the cut-off portion 6 may be formed in an approximately circular arcuate shape when viewed from the point light source 3 side. Accordingly, the light propagating inside the surface light source apparatus is reflected by the side surface 7 of the cut-off portion 6 having the approximately circular arcuate shape. Therefore, the diffused light can be emitted from the main surface 2, resulting in improvement of the emission efficiency of the emitted light.

In addition, as described in Embodiment 3, the length of the cut-off portion 6 in the longitudinal direction of the structure body 4 may be vary depending on the position of the structure body 4 on the opposed surface 21. Therefore, the area of the reflecting surface 5 of the structure body 4 varies depending on its position on the opposed surface 21, and this allows adjustment of the light amount of the emitted light for each position.

In addition, as described in Embodiment 3, the length of the cut-off remaining portion in the longitudinal direction of the structure body 4 may be different according to the position of the structure body 4 on the opposed surface 21. Therefore, the area of the reflecting surface 5 of the structure body 4 changes depending on the position of the structure body 4 on the opposed surface 21, allowing the adjustment of the amount of the emitted light for each position.

In addition, as described as an example in Embodiment 1, the shape of the cross-section of the structure body 4 taken along a direction orthogonal to the longitudinal direction of the structure body 4 may be an approximately polygonal shape. Therefore, the light reflected by the reflecting surface 5 can be diffused.

In addition, as described as an example in Embodiment 1, the shape of the cross-section of the structure body 4 taken along a direction orthogonal to the longitudinal direction of the structure body 4 may be an approximately trapezoidal shape. Therefore, the slope of the reflecting surface 5 can be set to arbitrary angles, and this allows adjustment of the luminance of the reflected light.

In addition, as described as an example in Embodiment 1, the shape of the cross-section of the structure body 4 taken along a direction orthogonal to the longitudinal direction of the structure body 4 may be an approximately triangular shape. Therefore, the slope of the reflecting surface 5 can be set to arbitrary angles, and this allows adjustment of the luminance of the reflected light. Moreover, the area of the structure body 4 is smaller when viewed from the main surface 2 side, compared with the structure body having a cross-section of a trapezoidal shape, with the slope of the reflecting surface 5 being set to the angle $\theta m1$ in both cases. Therefore, more structure body 4 can be disposed in the surface light source apparatus 1 in this case compared with the case of the trapezoidal shape, and this provides improvement in luminance.

In addition, as described as an example in Embodiment 1, the shape of the cross-section of the structure body 4 taken along a direction orthogonal to the longitudinal direction of the structure body 4 may be an approximately circular arcuate shape. Therefore, the light reflected by the reflecting surface 5 can be diffused.

In addition, as described as an example in Embodiment 1, the height h of the cut-off portion 6 and the height H of the structure body may satisfy 0<h<H. Therefore, the increase and decrease in the height h of the cut-off portion 6 allows the adjustment of the directivity of the light emitted from the main surface 2, and also allows the adjustment of the absolute value of the luminance.

In addition, in a case where a plurality of point light sources a provided on the surface light source apparatus, a plurality of structure bodies which corresponds to the plurality of point light sources respectively may be provided on the surface light source apparatus. Therefore, the light amount of each light source is adjustable by the structure body corresponding to the light source.

As described above, the surface light source apparatus of each Embodiment can suppress the occurrence of a bright line and non-uniformity of the luminance distribution of the light emitted from the surface light source apparatus by the surface light source apparatus itself, without using optical sheet. Because no optical sheet is required, it is possible to avoid attenuation of the light amount, which can occur when the light transmits the optical sheet. Therefore, if the same LED is used, improvement in luminance of the light emitted from the point light source 3 can be achieved. Moreover, if achievement of the same luminance is aimed, the quantity of the light source can be reduced, or electrical energy consumed by each light source can be suppressed. Moreover, the increase and decrease of the amount of the cut-off portion 6 of the structure portion 4 allows adjustment of the directivity of the light emitted from the main surface 2.

Other Embodiments

In this specification, five embodiments are described with respect to surface light source apparatuses. These Embodiments 1 to 5 can be combined to configure a new surface light source apparatus.

In the embodiments, the structure body of the surface light source apparatus is formed in a groove shape. However, the structure body is not necessary to be formed in a groove shape. The structure body may be formed, in the surface light source apparatus, with material which has different optical characteristics from the surface light source apparatus.

As described above, Embodiments are described as exemplifications of the art in the present disclosure. For this purpose, the accompanying drawings and the detailed description are provided.

Accordingly, among the components described in the accompanying drawings and the detailed description, components which are unnecessary to solve the problem may be described to exemplify the art as described above, as well as components which are necessary to solve the problem. Therefore, it should not immediately be construed that the unnecessary components are necessary as such unnecessary components are described in the accompanying drawings or the detailed description.

In addition, the embodiments as described above are to exemplify the art in the present disclosure, and therefore, the embodiments can be applied various kinds of changes, replacements, additions, omissions, and so on., provided that they fall within the scope of the claims or equivalents thereof.

INDUSTRIAL APPLICABILITY

The surface light source apparatuses according to the present disclosure are applicable to backlight devices for display devices using LED for information terminal apparatus such as smartphones or car navigation devices, thin lighting devices, and image displaying apparatus.

The invention claimed is:

1. A surface light source apparatus comprising:
   a point light source which emits light;
   an end face which takes in light emitted from the point light source;
   a main surface which emits the light;
   an opposed surface disposed opposite to the main surface; and
   a plurality of structure bodies having reflecting surfaces formed on the opposed surface, the reflecting surfaces facing the point light source,
   wherein each structure body has a cut-off portion which is an area where the reflecting surface is not present in a longitudinal direction of the structure body and in a height direction,
   wherein each structure body is formed on the opposed surface in an approximately circular arcuate shape around the point light source as a center, and
   wherein the cut-off portion has an approximately trapezoidal shape when the cut-off portion is viewed from the point light source side.

2. The surface light source apparatus according to claim 1, wherein
   the length of the cut-off portion in a longitudinal direction of each structure body varies depending on a position of the structure body on the opposed surface.

3. The surface light source apparatus according to claim 2, wherein
   a cross-section of each structure body taken along a direction orthogonal to the longitudinal direction of the structure body has an approximately polygonal shape.

4. The surface light source apparatus according to claim 3, wherein
   the cross-section of each structure body taken along a direction orthogonal to the longitudinal direction of the structure body has an approximately trapezoidal shape.

5. The surface light source apparatus according to claim 2, wherein
   a height h of the cut-off portion and a height H of each structure body satisfy 0<h<H.

6. The surface light source apparatus according to claim 5, comprising a plurality of point light sources including said point light source, wherein
   the plurality of structure bodies are provided corresponding respectively to the plural point light sources.

7. The surface light source apparatus according to claim 1, further comprising:
   a cut-off remaining portion which is an area where the reflecting surface is present wherein
   the length of the cut-off remaining portion in a longitudinal direction of each structure body varies depending on a position of the structure body on the opposed surface, the cut-off remaining portion being a portion except the cut-off portion in the structure body.

8. The surface light source apparatus according to claim 7, wherein
a cross-section of each structure body taken along a direction orthogonal to the longitudinal direction of the structure body has an approximately polygonal shape.

9. The surface light source apparatus according to claim 8, wherein
the cross-section of each structure body taken along a direction orthogonal to the longitudinal direction of the structure body has an approximately trapezoidal shape.

10. The surface light source apparatus according to claim 7, wherein
a height h of the cut-off portion and a height H of each structure body satisfy $0<h<H$.

11. The surface light source apparatus according to claim 10, comprising a plurality of point light sources including said point light source, wherein
the plurality of structure bodies are provided corresponding respectively to the plural point light sources.

* * * * *